(12) United States Patent
Shintani et al.

(10) Patent No.: US 6,490,001 B1
(45) Date of Patent: Dec. 3, 2002

(54) APPARATUS AND METHOD INCREASING SPEED OF RECEIVING TELEVISION BROADCASTS

(75) Inventors: Peter Shintani, Tokyo (JP); Hirofumi Usui, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/228,371

(22) Filed: Jan. 12, 1999

(30) Foreign Application Priority Data

Jan. 12, 1998 (JP) .......................................... 10-003874
Jun. 1, 1998 (JP) .......................................... 10-151223

(51) Int. Cl.$^7$ ................................................. H04N 3/21
(52) U.S. Cl. ......................... 348/554; 348/555; 348/725
(58) Field of Search ................................. 348/554, 555, 348/553, 724, 725, 906; 225/38, 56

(56) References Cited

U.S. PATENT DOCUMENTS

| | | | | |
|---|---|---|---|---|
| 5,600,328 A | * | 2/1997 | Wasilewski | 348/468 |
| 5,661,528 A | * | 8/1997 | Han | 348/607 |
| 5,933,192 A | * | 8/1999 | Crosby et al. | 348/387 |
| 5,946,052 A | * | 8/1999 | Ozkan et al. | 348/555 |
| 5,966,187 A | * | 10/1999 | Do | 348/584 |
| 5,995,168 A | * | 11/1999 | Yagi | 348/725 |
| 6,005,640 A | * | 12/1999 | Strolle et al. | 348/726 |
| 6,014,178 A | * | 1/2000 | Jeon et al. | 348/554 |
| 6,031,580 A | * | 2/2000 | Sim | 348/565 |

* cited by examiner

Primary Examiner—Victor R. Kostak
(74) Attorney, Agent, or Firm—Lerner, David, Littenberg, Krumholz & Mentlik, LLP

(57) ABSTRACT

A receiving apparatus and a receiving method arranged to reduce the delay time of tuning to and reception of a digital TV broadcast actually and apparently. A coefficient memory for storing coefficient data to be supplied to a channel equalizer of a front end section is provided. A control section generates equalizer coefficients supplied to the channel equalizer by using the equalizer coefficients in the coefficient memory, and updates the equalizer coefficients stored in the coefficient memory by substituting the generated equalizer coefficients for them. The control section supplies a predetermined video signal to a display section instead of a video output from a decoding section before the video output from the decoding section is obtained.

29 Claims, 14 Drawing Sheets

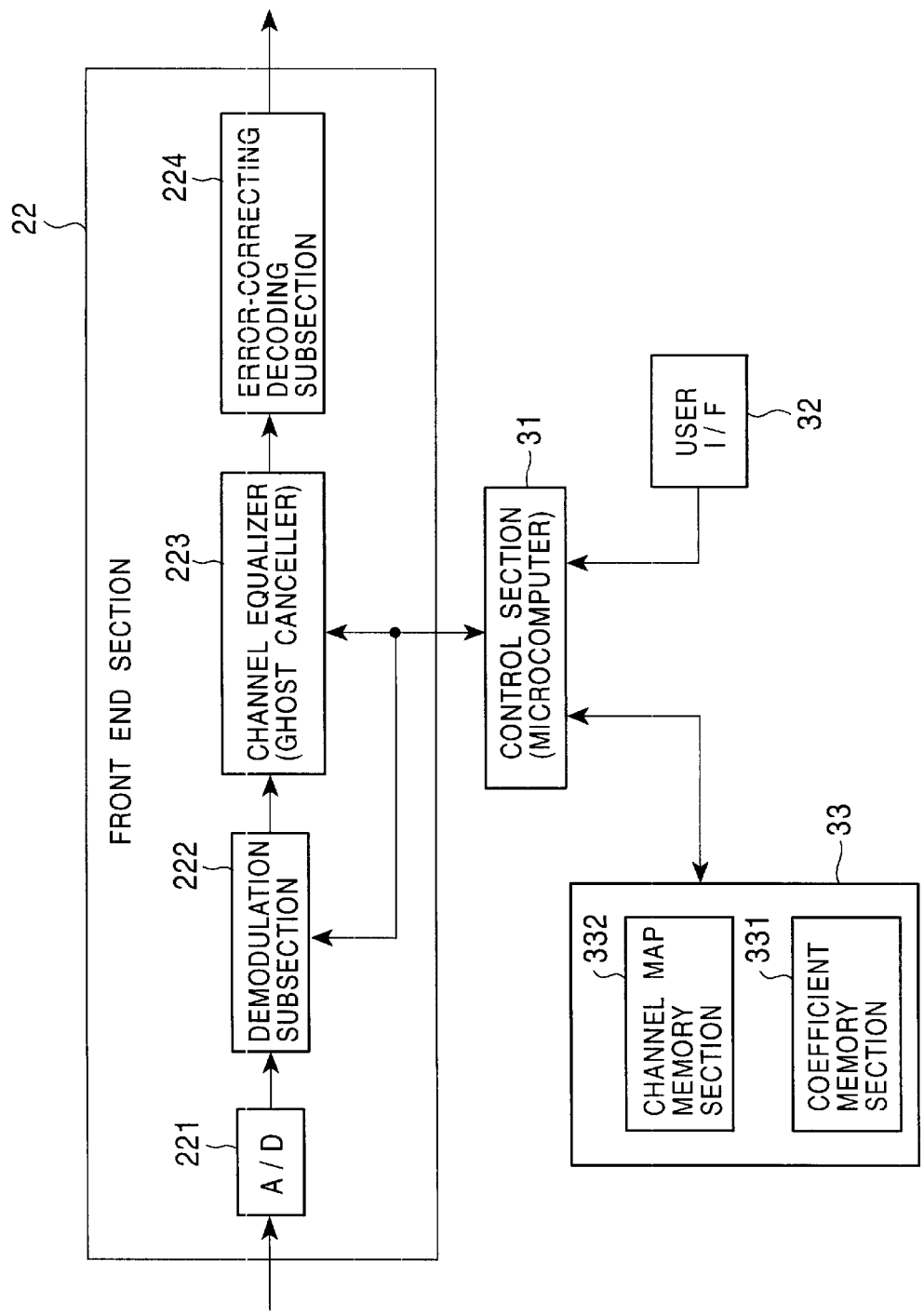

FIG. 3A

| CHANNEL | EQUALIZER COEFFICIENTS |
|---|---|
| CH1 | K11, K12 · · · · K1n |
| CH2 | K21, K22 · · · · K2n |
| CH3 | K31, K32 · · · · K3n |
| ⋮ | ⋮ |

FIG. 3B

| CHANNEL | MARKER BIT | OTHER |
|---|---|---|
| CH1 | 0 | |
| CH2 | 1 | · · · bps |
| CH3 | 0 | |
| ⋮ | ⋮ | ⋮ |

| MARKER BITS | MODULATION METHOD | DISTRIBUTION SYSTEM |
|---|---|---|
| 0 0 | NTSC | GROUND WAVES AND CABLE TV |
| 0 1 | B/16VSB | GROUND WAVES / CABLE TV |
| 1 0 | QAM | CABLE TV |
| 1 1 | QPSK | SATELLITE BROADCASTING |

APPARATUS AND METHOD INCREASING SPEED OF RECEIVING TELEVISION BROADCASTS

BACKGROUND OF THE INVENTION

1. Field of the Invention

The present invention relates to an apparatus for receiving a digital television broadcast such as a digital ground wave broadcast or a digital cable broadcast, to a receiving apparatus capable of receiving both digital television broadcasts and current analog broadcasts, and to a receiving apparatus for receiving both digital and analog broadcasts.

2. Description of the Related Art

Digital broadcasting systems have been brought into use as television (TV) broadcasting systems following analog TV broadcasting systems.

A receiver for use in a digital broadcasting system such as a digital ground wave type broadcasting system or a digital cable type broadcasting system has a front end section, a transport section, an MPEG decoding section, a display processing section, and a control section. The front end section selects one of a plurality of carriers of electromagnetic waves received by an antenna, cancels ghost signals by using a digital filter (performs channel equalization), corrects errors, and outputs a transport stream. The transport section separates transport packets of the desired channel designated by a user from a plurality of channels multiplexed in the transport stream from the front end section, and descrambles the separated packets. The MPEG decoding section decodes MPEG-compressed video and audio signals in the desired channel transmitted through the medium of the transport packets output from the transport section to obtain video and audio outputs. The display processing section converts the MPEG-decoded images into a display format in accordance with the NTSC (National Television System Committee) system or the like. The control section is formed of a microcomputer or the like for controlling each section.

In the case of receiving an analog TV broadcast, a broadcast image can be immediately displayed on the screen of a display when a tuner selects the corresponding one of a plurality of carriers. Accordingly, in such receiving, the delay time between the moment at which a user inputs a command to change a channel and the moment at which an image and sound in a new channel are output depends only upon the time required for tuning in the tuner. In general, the time required for tuning in receivers for receiving analog TV broadcasts is about 200 to 300 msec. In analog TV broadcast receivers, no image is displayed for the time period corresponding to the delay time because only a distorted image can be displayed in the period corresponding to the delay time.

In the case of a receiving a digital TV broadcast, it is possible that about one second will be taken as a delay time between the moment at which a command to perform tuning for changing a channel is given and the moment at which an image appears on the screen of a display.

That is, for example, the time required for processing in the front end section, depending upon the number of taps of the digital filter for cancellation of ghost signals, is about 500 msec at the worst. A time of 100 msec is also required for MPEG decoding. Further, 30 msec is required for conversion of the MPEG-decoded output to a display format such as that in accordance with the NTSC system. The total delay time is the sum of these time periods and the tuner section processing time of about 200 to 300 msec.

To avoid display of a distorted image on the screen in the digital TV broadcast receiver, the method of displaying no image during the delay time may be used, as is in the conventional analog TV broadcast receiver. However, ordinary users, accustomed to the tuning speed of the existing analog TV broadcast receivers, are liable to feel that the above-mentioned delay in digital TV broadcast receivers is excessively long, and may be irritated when feeling a delay of display of a received image.

Moreover, many users expect the digital system to be higher in speed and quality than the analog system. For this reason, the above-described problem of a delay of receiving a digital TV broadcast is serious.

It is thought that analog broadcasting and digital TV broadcasting will coexist for a period of time, and that receivers capable of receiving both analog and digital TV broadcasts will be provided.

If so, and if it is impossible to immediately identify a channel designated by a channel selecting operation as an analog TV broadcasting channel or a digital TV broadcasting channel, a process is required in which tuning to the channel and reception of the channel are performed by each of analog and digital receiving sections to identify the channel. In such a case, however, the delay time before outputting an image and sound is further increased.

SUMMARY OF THE INVENTION

In view of the above-described circumstances, an object of the present invention is to provide a receiving apparatus and a receiving method arranged to reduce the delay time of tuning to and reception of a digital TV broadcast effectively and apparently.

To achieve the above-described object, according to a first aspect of the present invention, there is provided a television broadcast receiving apparatus comprising a tuner section for selecting one carrier from an input signal, a front end section for demodulating the carrier selected by the tuner section, the front end section having a channel equalizer formed of a digital filter, a transport section for separating a desired channel from a stream from the front end section, and for descrambling in the separated channel, a decoding section for decoding a signal in the separated desired channel to obtain at least one of an output video signal and an output audio signal, a display section for displaying an image based on the output video signal from the decoding section, a coefficient memory for storing equalizer coefficients to be supplied to the digital filter forming the channel equalizer, and control means for generating equalizer coefficients to be supplied to the channel equalizer by using the equalizer coefficients in the coefficient memory.

In this receiving apparatus, computation of equalizer coefficients, with which a longest processing delay is caused in the total processing delay of the front end section, which is particularly long, can be performed by using equalizer coefficients stored in the coefficient memory to increase the processing speed. The time period between the moment at which a user inputs a channel change command and the moment at which an image is thereafter output is thereby reduced.

In the above-described receiving apparatus, control means may update the equalizer coefficients stored in the coefficient memory by using the equalizer coefficients newly generated.

The equalizer coefficients in the coefficient memory are thereby updated to values closer to ideal values, thereby further increasing the equalizer coefficient computation speed.

The receiving apparatus may also have means for supplying a predetermined wait-time video signal to the display section for a time period before an output video signal is obtained from the decoding section.

According to this arrangement, a wait-time image, e.g., an image containing letters "Tuning . . . " or the like is displayed instead of blanking the display before the received image is displayed, thereby relieving user's irritation during the waiting time.

In the above-described receiving apparatus, an image for identification of the selected desired channel is displayed by the display section for a time period before the desired video output is obtained from the decoding section.

For example, a logotype or the like of a broadcasting selected by a user is displayed on the screen during the waiting time, thereby further relieving user's irritation.

The above-described receiving apparatus may further have storage means for storing program information previously provided in the same channel as the above-mentioned desired channel, and the program information previously provided in the desired channel and read output from the storage means is displayed by the display section for a time period before the desired video output is obtained from the decoding section.

For example, in a case where a plurality of programs are broadcast in one digital television broadcasting channel, program information previously provided is displayed as a wait-time image. Considering that the probability of each of such previously provided programs being changed is ordinarily considered to be low, previously provided program information can be conveniently used as advance data for selecting programs according to user's need after tuning to the corresponding channel.

According to a second aspect of the present invention, there is provided a television broadcast receiving apparatus comprising a first tuner section for receiving one of digital television broadcasts, the first tuner section selecting one carrier from an input signal, a digital demodulation processing section for obtaining an output video signal and an output audio signal by demodulating an output signal from the first tuner section, by separating a desired channel, and by performing decoding, a second tuner section for receiving one of analog television broadcasts, the second tuner section selecting one carrier from an input signal, an analog demodulation processing section for obtaining an output video signal and an output audio signal in a desired channel by demodulating an output signal from the second tuner section, changeover means for making a changeover between a state where an image display and an audio output are made as reception outputs from the output video signal and the output audio signal from the digital demodulation processing section, and a state where an image display and an audio output are made as reception outputs from the output video signal and the output audio signal from the analog demodulation processing section, a channel map memory for storing identification information for enabling each of channels selectable as a tuning target to be identified as a digital television broadcasting channel or an analog television broadcasting channel, and control means for making a determination as to whether a channel selected by a channel selecting operation performed by a user is a digital television broadcasting channel or an analog television broadcasting channel, for supplying a tuning control signal to the corresponding one of the first tuner section and the second tuner section, and for changing the changeover means, the control section making the determination by referring to the channel map memory when the user performs the channel selecting operation.

In the channel map memory of this receiving apparatus, information for enabling each channel to be identified as a digital television broadcasting channel or an analog television broadcasting channel is stored. When a user performs a channel selecting operation, a determination as to whether the selected channel is an analog television broadcasting channel or a digital television broadcasting channel is made by referring to the channel map memory. Then, a tuning control signal is supplied to the suitable one of the analog television broadcast tuner section and the digital television broadcast tuner section according to the result of the determination. Therefore, there is no need for temporarily performing tuning by each of the first and second tuner sections. The tuning speed can be increased by eliminating the time for this tuning.

The arrangement of the receiving apparatus according to the second aspect of the invention may be such that analog television broadcast signals and/or the digital television broadcast signals contain guide information for presenting to a viewer a present state of broadcasting of channel programs or a schedule of broadcasting of channel programs, the guide information including a marker bit for enabling each channel to be identified as an analog broadcasting channel or a digital broadcasting channel, and the apparatus further comprises means for extracting the guide information from the broadcast signal, and for storing, as the identification information in the channel map memory, the marker bit obtained from the extracted guide information.

According to this arrangement, marker bits contained in broadcast signals are stored in the channel map to enable each channel to be identified as a digital television broadcast signal or an analog television broadcast signal, thereby eliminating the need for a process in which each channel is previously received to be ascertained as a digital television broadcasting channel or an analog television broadcasting channel. Even if the channel assignment is changed, the identification information can be updated by using the guide information. Thus, correct information for enabling each channel to be identified as a digital television broadcasting channel or an analog television broadcasting channel can always be maintained.

The arrangement of the above-described receiving apparatus may also be such that, if a channel selected by a user is an analog television broadcasting channel, a control signal for selecting a carrier in the selected channel is supplied to the second tuner section, and a control signal for selecting a carrier of a digital television broadcast in a channel supposed by using the channel map memory to be next selected by the user in the vicinity of the presently received channel is supplied to the first tuner section.

If the presently received television broadcast is an analog television broadcast, preliminary reception of a channel supposed to be next selected by the first tuner for receiving digital television broadcasts is performed in the background. A digital television broadcasting channel to which one of the tuners other than that presently tuned to the analog television broadcast, i.e., the first tuner, is to be tuned can be easily found by using the identification information in the channel map memory.

Further, the arrangement of the above-described receiving apparatus may be such that, if a channel selected by a user is an analog television broadcasting channel, a control signal for selecting a carrier in the selected channel is supplied to the second tuner section, and a control signal for selecting a carrier of a digital television broadcast in a channel supposed by using the channel map memory to be next selected by the user is supplied to the first tuner section, and that, if a channel selected by a user is a digital television broadcasting channel, a control signal for selecting a carrier in the selected channel is supplied to the first tuner section, and a control signal for selecting a carrier of an analog television broadcast in a channel supposed by using the channel map memory to be next selected by the user in the vicinity of the presently received channel is supplied to the second tuner section.

If the presently received television broadcast is an analog television broadcast, preliminary reception of a channel supposed to be next selected by the first tuner for receiving digital television broadcasts is performed in the background. If the presently received television broadcast is a digital television broadcast, preliminary reception of a channel supposed to be next selected by the second tuner for receiving analog television broadcasts is performed in the background. If the channel preliminarily received in this manner is actually selected subsequently, the receiving apparatus is immediately set in the state of being tuned to the channel to obtain a video output and/or an audio output.

When this preliminary reception is performed in the background, a digital television broadcasting channel to which one of the tuners other than that presently tuned to the selected channel is to be tuned can be easily found by using the identification information in the channel map memory.

According to a third aspect of the present invention, there is provided a television broadcast receiving apparatus comprising a first tuner section for receiving one of digital television broadcasts, the first tuner section selecting one carrier from an input signal, a digital demodulation processing section for obtaining an output video signal and an output audio signal by demodulating an output signal from the first tuner section, by separating a desired channel, and by performing decoding, a second tuner section for receiving one of analog television broadcasts, the second tuner section selecting one carrier from an input signal, an analog demodulation processing section for obtaining an output video signal and an output audio signal in a desired channel by demodulating an output signal from the second tuner section, changeover means for making a changeover between a state where an image display and an audio output are made as reception outputs from the output video signal and the output audio signal from the digital demodulation processing section, and a state where an image display and an audio output are made as reception outputs from the output video signal and the output audio signal from the analog demodulation processing section, control means for changing the changeover means according to whether a channel selected in accordance with a tuning operation performed by a user is a digital television broadcasting channel or an analog television broadcasting channel, and preliminary reception means for supplying a signal for receiving a broadcast signal in a channel supposed to be next selected by the user in the vicinity of the presently received channel to one of the first and second tuner sections not receiving the broadcast signal from which an image display and audio output are made as reception outputs through the changeover means.

In this receiving apparatus, one of the tuners other than that presently tuned to the selected channel is in a state for preliminarily receiving another channel supposed to be next selected by the user. Therefore, if the preliminarily received channel is actually selected by the user, the receiving apparatus can output an image and a sound in a markedly short time.

The arrangement of the receiving apparatus according to the second or third aspect of the invention may be such that the digital demodulation processing section has a channel equalizer formed of a digital filter, and the apparatus further comprises a coefficient memory for storing equalizer coefficients to be supplied to the digital filter forming the channel equalizer, and control means for generating equalizer coefficients to be supplied to the channel equalizer by using the equalizer coefficients in the coefficient memory.

According to this arrangement, coefficients to be supplied to the channel equalizer are computed by using the equalizer coefficients stored in the coefficient memory. By this simplification of computation, the time required for processing in the digital demodulation processing section can be reduced.

The apparatus according to the third aspect of the invention may also comprise a channel map memory for storing identification information for enabling each of channels selectable as a tuning target to be identified as a digital television broadcasting channel or an analog television broadcasting channel. When a user performs a channel selecting operation, a determination is made by referring to the channel map memory as to whether a channel selected by the channel selecting operation is a digital television broadcasting channel or an analog television broadcasting channel.

According to this arrangement, by referring to the identification information stored in the channel map memory and used for identifying each channel as an analog or digital television broadcasting channel, a tuning control signal can be immediately supplied to a suitable one of the tuner section for receiving analog television broadcasts and the tuner section for receiving digital television broadcasts. Therefore, there is no need for temporarily performing tuning by each of the first and second tuner sections. The tuning speed can be increased by eliminating the time for this tuning.

The arrangement may also be such that, if a channel selected by a user is an analog television broadcasting channel, a control signal for selecting a carrier in the selected channel is supplied to the second tuner section, and a control signal for selecting a carrier of a digital television broadcast in a channel supposed by using the channel map memory to be next selected by the user in the vicinity of the presently received channel is supplied to the first tuner section.

If the presently received television broadcast is an analog television broadcast, preliminary reception of a channel supposed to be next selected by the first tuner for receiving digital television broadcasts is performed in the background. A digital television broadcasting channel to which one of the tuners other than that presently tuned to the analog television broadcast, i.e., the first tuner, is to be tuned can be easily found by using the identification information in the channel map memory.

Further, the arrangement may be such that, if a channel selected by a user is an analog television broadcasting channel, a control signal for selecting a carrier in the selected channel is supplied to the second tuner section, and a control signal for selecting a carrier of a digital television broadcast in a channel supposed by using the channel map memory to be next selected by the user is supplied to the first tuner section, and that, if the channel selected by the user is a digital television broadcasting channel, a control signal for selecting a carrier in the selected channel is supplied to the first tuner section, and a control signal for selecting a carrier of an analog television broadcast in a channel supposed by using the channel map memory to be next selected by the user in the vicinity of the presently received channel is supplied to the second tuner section.

If the presently received television broadcast is an analog television broadcast, preliminary reception of a channel supposed to be next selected by the first tuner for receiving digital television broadcasts is performed in the background. If the presently received television broadcast is a digital television broadcast, preliminary reception of a channel supposed to be next selected by the second tuner for receiving analog television broadcasts is performed in the background. If the channel preliminarily received in this manner is actually selected subsequently, the receiving apparatus is immediately set in the state of being tuned to the channel to obtain a video output and/or an audio output.

When this preliminary reception is performed in the background, a digital television broadcasting channel to which one of the tuners other than that presently tuned to the selected channel is to be tuned can be easily found by using the identification information in the channel map memory.

BRIEF DESCRIPTION OF THE DRAWINGS

FIG. 2 is a block diagram of certain portions of the apparatus shown in FIG. 1;

FIGS. 3A and 3B are diagrams showing the contents of a nonvolatile memory shown in FIG. 1;

DESCRIPTION OF THE PREFERRED EMBODIMENTS

Embodiments of the present invention will be described below with reference to the accompanying drawings.

First Embodiment

Figure 1:
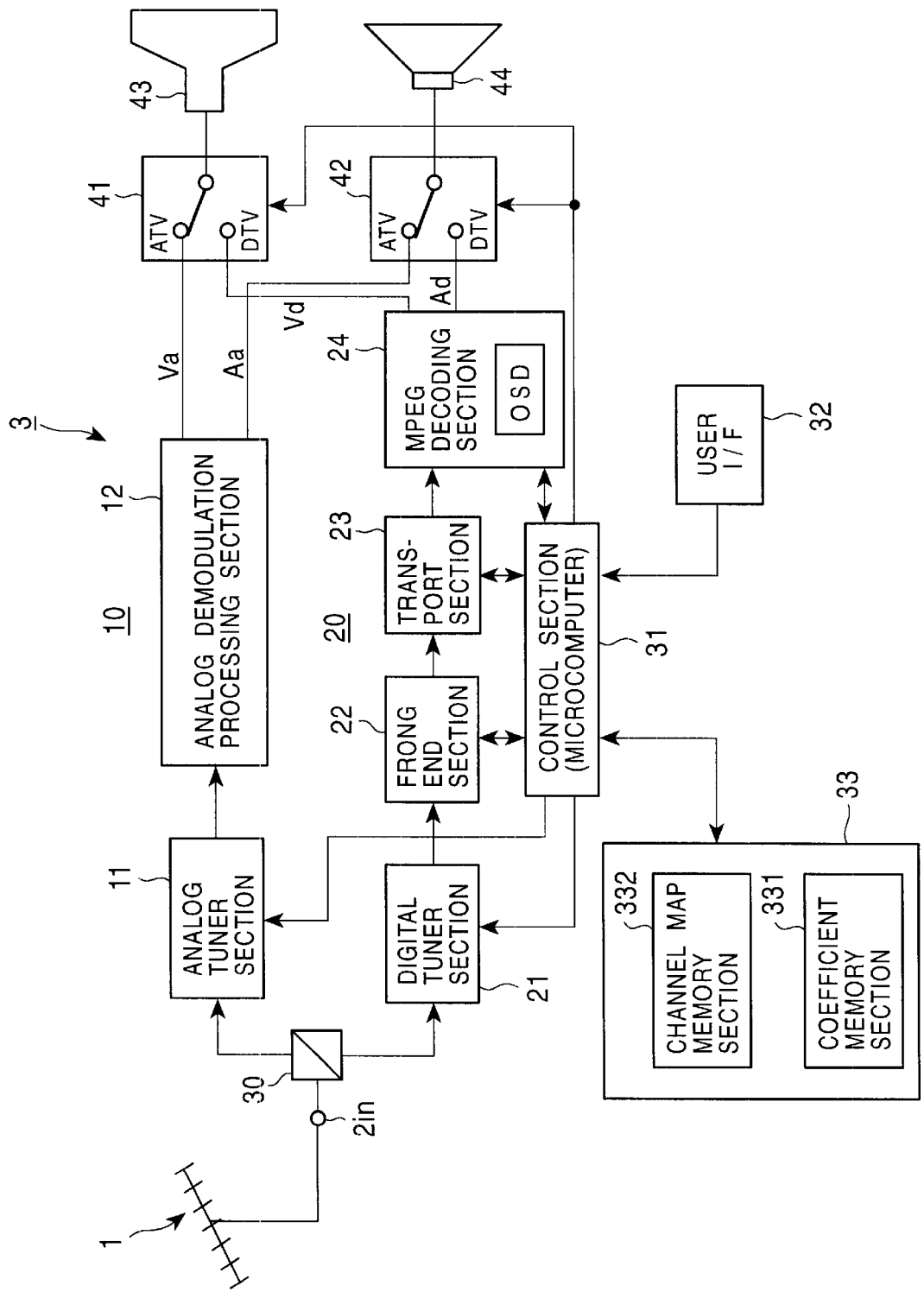
FIG. 1 is a block diagram of a receiving apparatus which represents a first embodiment of the present invention.

FIG. 1 is a block diagram of a receiving apparatus 3 which represents a first embodiment of the present invention. The receiving apparatus of the first embodiment can receive analog TV broadcasts and digital TV broadcasts provided by satellite broadcasting, and has an analog TV broadcast receiver 10 and a digital TV broadcast receiver 20. This embodiment will be described by assuming that an analog TV broadcast signal is an NTSC TV signal.

Referring to FIG. 1, electric waves received by a receiving antenna 1 are input to the TV broadcast receiving apparatus of this embodiment via an input terminal 2in.

In the receiving apparatus 1, a received signal input via the input terminal 2in is supplied by a distributor 30 to an analog tuner section 11 of the analog TV broadcast receiver 10 and to a digital tuner section 21 of the digital TV broadcast receiver 20.

In this embodiment, each of the tuner section 11 and the tuner section 21 is formed as a synthesizer tuner, and PLL data, i.e., data of the frequency ratio of a variable frequency divider circuit of a phase-locked loop is supplied to each of the tuner sections 11 and 12 as a tuning control signal from a control section 31. The control section 31 has a memory (not shown) for storing PLL data for each of the channels.

The analog tuner section 11 of the analog TV broadcast receiver 10 receives PLL data as a tuning control signal from the control section 31 having a microcomputer, and selects one of a plurality of carriers contained in the intermediate frequency signal input via the input terminal 2in. The selected carrier is determined in accordance with a channel selection command input by a user's operation through a user interface 32. In this embodiment, the user interface 32 includes a remote control transmitter and a remote control receiver, not shown, as well as button keys provided on the receiving apparatus 3.

An output from the analog tuner section 11 is supplied to an analog demodulation processing circuit 12. In analog TV broadcasting, one channel is assigned to one carrier. The analog demodulation processing circuit 12 demodulates the carrier selected by the tuner 11 and outputs a video output signal Va and an audio output signal Aa.

Video output signal Va is supplied to an input terminal ATV of two input terminals of a video change switch circuit 41. Audio signal Aa is supplied to an input terminal ATV of two input terminals of an audio change switch circuit 42. Video output signal Va passed through the switch circuit 41 is supplied to a display 43 to form an image on the screen of the display 43. Audio output signal Aa passed through the switch circuit 42 is supplied to a speaker 44 to output sound.

The digital tuner section 12 of the digital TV broadcast receiver 20 receives PLL data as a tuning control signal from the control section 31 and selects one of a plurality of carriers contained in the received signal input via the input terminal 2in, as does the analog tuner section 11. The selected carrier is determined in accordance with a channel selection command input by a user's operation through the user interface 32.

An output from the digital tuner section 21 is supplied to a digital demodulation processing unit which is formed of a front end section 22, a transport section 23 and an MPEG decoding section 24.

As shown in FIG. 2, the front end section 22 is constituted of an A/D converter 221, a demodulation subsection 222, a channel equalizer 223, and an error-correcting decoding subsection 224. The output from the digital tuner section 21 is input to the A/D converter 221 of the front end section 22 to be converted into a digital signal.

The digital signal from the A/D converter 221 is supplied to the demodulation subsection 222 to undergo digital demodulation. The modulation method of digital broadcasting is, for example, a vestigial sideband (VSB) modulation. The signal obtained by digital demodulation is supplied to the channel equalizer 223.

The channel equalizer 223 functions mainly as a ghost canceller, and has a multi-tap digital filter. The control section 31 computes and sets suitable values supplied as coefficients (equalizer coefficients) to a plurality of multipliers of the digital filter of the channel. The channel equalizer 223 performs ghost cancellation by using these values.

An output from the channel equalizer 223 is supplied to the error-correcting decoding section 224 to undergo error-correcting decoding. In digital TV broadcasting, reliable error-correcting coding is performed in order to maintain favorable and stable reception qualities even during low-C/N reception. For example, error-correcting coding such as Reed-Solomon coding or trellis coding is performed. In the receiving apparatus, Reed-Solomon decoding or Viterbi decoding is performed.

The front end section 22 forms a transport stream output by performing demodulation and error-correcting processing as described above, and supplies the output to the transport section 23. The output from the front end section 22 may also contain a scrambled signal for a pay channel or the like.

The transport section 23 performs descrambling and demultiplexing. The scrambled signal from the front end section 22 is descrambled by the transport section 23.

In the transport stream from the front end section 22, guide information called electronic program guide (EPG) usable for enabling a user to select a program from a multiplicity of channels according to his or her need is also multiplexed.

In the transport section 23, transport packets in a channel selected by a user are extracted by demultiplexing under the control of the control section 31 according to the selection made by the user through the user interface 32. Each packet, containing MPEG-compressed video and audio signals, is supplied to the MPEG decoding section 24.

The MPEG decoding section 24 performs expansion decoding of the MPEG-encoded video and audio signals. In this embodiment, the video signal is converted into a video signal Vd in accordance with the NTSC system. The video signal Vd is supplied to the other input terminal DTV of the switch circuit 41. The audio signal is converted into an analog audio signal Ad by D/A conversion. The analog audio signal Ad is supplied to the other input terminal DTV of the switch circuit 42. The video output signal Vd passed through the switch circuit 41 is supplied to the display 43 to form an output image on the screen. The audio output signal Ad passed through the switch 42 is supplied to the speaker 44 to output sound.

The MPEG decoding section 24 has an on-screen-display (OSD) function. The control section 31 can display EPG information, a menu, etc., by superposing it on a program image or by substituting it for an image in a broadcast program after stopping display of a broadcast program image.

That is, the control section 31 extracts transport packets containing EPG data from the transport section 23, forms a program table data using character data from a font read-only memory (ROM) (not shown), and displays the program table on the screen of the display 43 by using the OSD function of the MPEG decoding section 24. A user can perform a program selecting operation on the electronic program table displayed on the screen.

If a user selection input is given by a user, the control section 31 identifies the user selection input on the electronic program table displayed on the screen, controls the digital tuner section 21 according to the input, and controls the transport section 23 so that the transport section 23 extracts transport packets in the channel designated by the user selection input.

Equalizer coefficients supplied t the channel equalizer 223 of the front end section 22 in the digital demodulation processing unit of the digital TV broadcast receiver 20 are computed by the control section 31, as mentioned above. The control section 31 computes equalizer coefficients in a learning manner by referring to a signal for ghost cancellation contained in each of one-frame units of the received signal. Ordinarily, for such computation of suitable equalizer coefficients by learning, ten or more frames are required. Under this condition, a delay of about several hundred milliseconds in the front end section 22 results, as mentioned above.

In this embodiment, to solve this problem, equalizer coefficients previously determined with respect to each of the channels to which tuning is to be performed are stored in a coefficient memory section 331 of a nonvolatile memory 33. Suitable equalizer coefficients with respect to one of the channels to which tuning will be performed are obtained by using the corresponding equalizer coefficients stored in the coefficient memory section 331, and are supplied to the channel equalizer 223.

That is, in the coefficient memory section 331, digital filter equalizer coefficients $K11, K12, \ldots, K1n; K21, K22, \ldots, K2n; K31, K32, \ldots, K3n; \ldots$ are stored by being related to channels $CH1, CH2, \ldots, CHm$, as shown in FIG. 3A. The equalizer coefficients K for each channel are values previously updated and stored in the coefficient memory section 331 at the time of past reception of the same channel, as described below.

Thus, computation of equalizer coefficients in the control section 31 with respect to one selected channel is performed not by newly performing learning but by using the results of past learning. Ghost generation conditions are not thought to be largely changeable. Therefore, the front end section 22 of this embodiment has a reduced processing delay time.

In this embodiment, a channel map is also stored in the nonvolatile memory 33. From the channel map, a marker bit is obtained as information for enabling each channel to be identified as an analog TV broadcasting channel or a digital TV broadcasting channel.

The channel map is stored in a channel map memory section 332 of the nonvolatile memory 33. For example, channel map marker bit information is previously written in the channel map memory section 332 with respect to all possible available channels according to a sales area when the receiving apparatus 3 is manufactured or shipped from a factory. The arrangement may alternatively be such that reception is performed with respect to all possible channels, each channel is identified as an analog or digital channel, and a marker bit according to the identification result is formed and written to the channel map memory section 332.

FIG. 3B shows an example of the contents of the channel map memory section 332. In the example shown in FIG. 3B, one marker bit is provided for identification of one channel. For example, a marker bit "0" designates an analog TV broadcasting channel while a marker bit "1" designates a digital TV broadcasting channel. In this embodiment, with respect to a digital TV broadcasting channel, information indicting, for example, a bit rate is also stored in the channel map memory 332, as described below.

When the control section 31 receives an input made by a user's channel selecting operation through the user interface 32, it refers to the marker bit for the selected channel in the channel map memory section 332 of the nonvolatile memory 33 to identify the selected channel as an analog TV broadcasting channel or a digital TV broadcasting channel. If the control section 31 identifies the selected channel as an analog TV broadcasting channel, it sends PLL data for selecting the carrier corresponding to the channel to the analog tuner section 11.

If the control section 31 identifies the selected channel as a digital TV broadcasting channel, it sends PLL data for selecting the carrier corresponding to the channel to the digital tuner section 21. In this case, the control section 31 controls the demodulation subsection 222 of the front end section 22 according to the bit rate information stored in the channel map memory section 332.

That is, in this embodiment, when a user performs a channel selecting operation, the channel designated by the selecting operation can be identified as an analog TV broadcasting channel or a digital TV broadcasting channel from the channel map in the memory section 332. Consequently, the tuning operation can be performed speedily since there is no need for an identification process in which PLL data is sent to each of the two tuner sections 11 and 21, the receiving operation is temporarily performed, and the selected channel is identified as a digital TV broadcasting channel or an analog TV broadcasting channel from the reception results.

The operation of the control section 31 for tuning of the receiving apparatus shown in FIG. 1 will be described with reference to the flowcharts of FIG. 4 and other figures.

Figure 4:
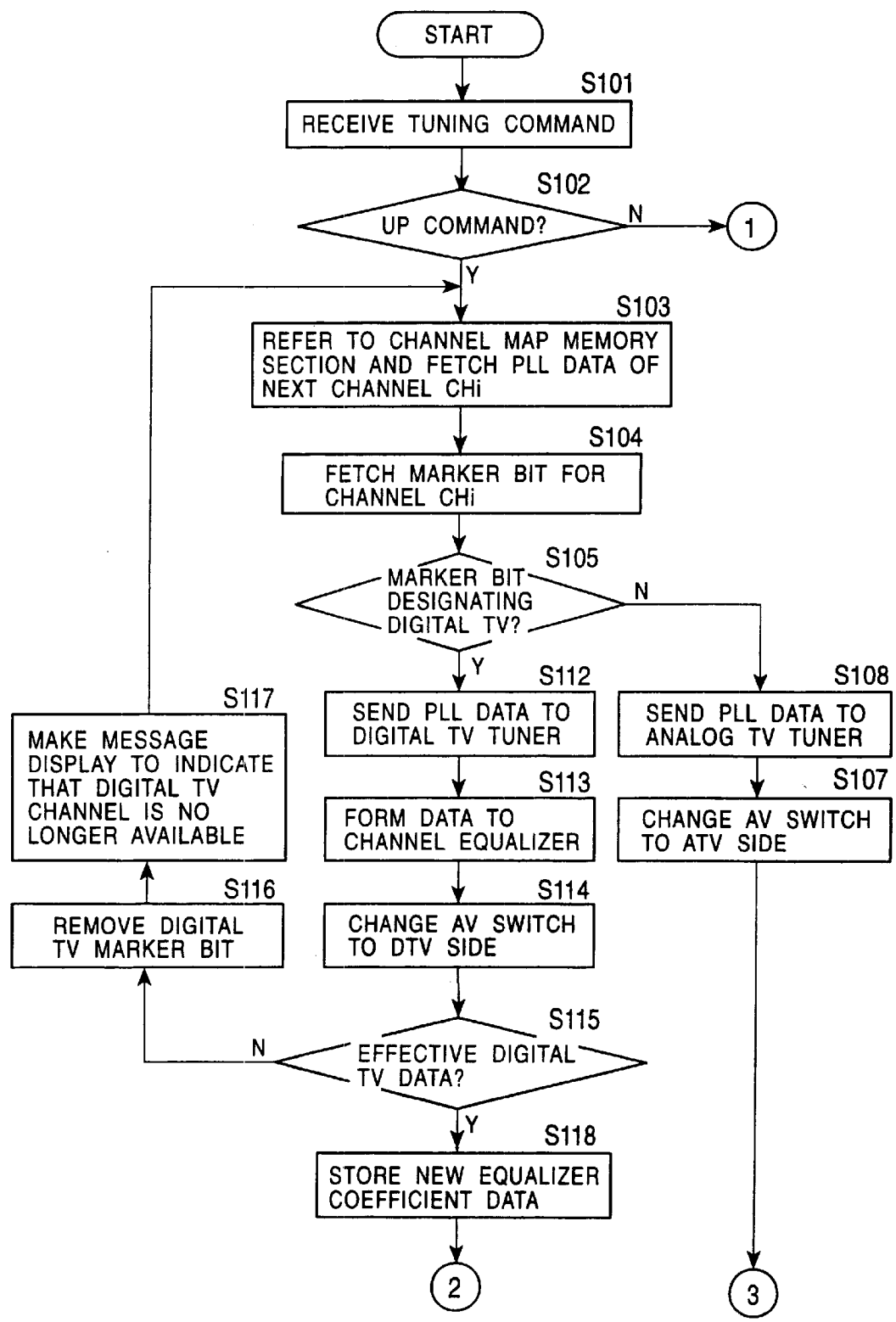
FIG. 4 is a portion of a flowchart of a tuning processing routine in the receiving apparatus of the first embodiment.

Referring to FIG. 4, when the control section 31 receives a tuning command from the user interface 32 (step S101), the process advances to step S102 and the control section 31 makes a determination as to whether the input command is a channel-scan-tuning up command. If the input command is an up command, the process advances to step S103 and the control section 31 fetches PLL data of channel CHi designated by the up command. In step S104, the control section 31 fetches the marker bit for the channel CHi from the channel map memory section 332.

In step S105, the control section 31 makes a determination as to whether the marker bit designates digital TV broadcasting. If the market bit does not designate digital TV broadcasting, that is, the marker bit designates analog TV broadcasting, the process advances to step S106 and the control section 31 sends PLL data to the analog tuner section 11. In step S107, the control section 31 changes each of the switch circuits 41 and 42 to the input terminal ATV side.

Figure 5:
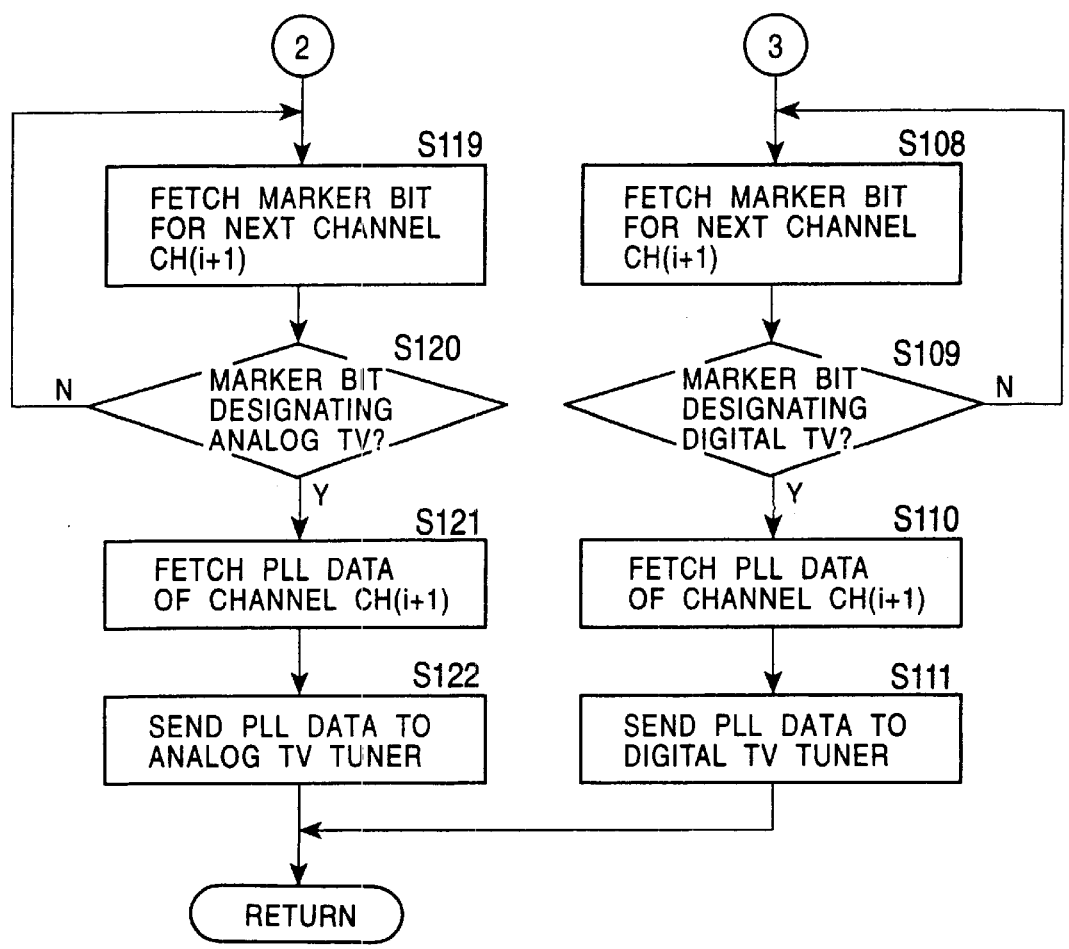
FIG. 5 is a portion of the flowchart of the tuning processing routine in the receiving apparatus of the first embodiment.

Subsequently to step S107, the control section 31 performs, in the background of analog TV broadcast reception, preliminary reception processing in the digital TV broadcast receiver 20 shown as steps S108 to S111 in FIG. 5. In step S108, the control section 31 fetches from the channel map memory section 332 the marker bit for the channel CH(i+1) to be next identified in up channel-scan tuning. In step S109, the control section 31 makes a determination as to whether the marker bit designates digital TV broadcasting.

If the determination in step S109 is that the marker bit does not designate digital TV broadcasting, the process returns to step S108 and the control section 31 fetches the marker bit for the further next channel (channel CH(i+2) as seen from channel CHi). These steps are repeated until the marker bit designating digital TV broadcasting is recognized.

If the determination in step S109 is that the marker bit designates digital TV broadcasting, the process advances to step S110 and the control section 31 fetches PLL data of the next channel CH(i+1) from the nonvolatile memory 33. In step S111, the control section 31 sends the fetched PLL data to the digital tuner section 21 and makes the digital TV broadcast receiver 20 perform preliminary reception, thereby finishing this tuning processing routine.

If the determination in step S105 is that the marker bit designates digital TV broadcasting, the process advances to step S112 and the control section 31 sends PLL data to the digital tuner section 21. In step S113, the control section 31 fetches the equalizer coefficient data for the present channel from the coefficient memory section 331 and computes new suitable equalizer coefficients by using this coefficient data and learning information obtained from received information. In step S114, the control section 31 changes each of the switch circuits 41 and 42 to the input terminal DTV side.

In step S115, the control circuit 31 makes a determination as to whether effective digital TV broadcast data has been obtained. For example, this determination is made according to whether video data or audio data has been obtained. If the result of this determination is that no effective digital TV broadcast data has been obtained, the process advances to step S116 and the control section 31 erases the marker bit for the present channel in the channel map memory section 332.

In step S117, the control section 31 displays on the screen of the display 43 a message that the present digital TV broadcasting channel is no longer available. That is, the control section 31 forms message data and displays the message data by superposing it on a broadcast program image in the channel by using the OSD function of the MPEG decoding section or by substituting it for the channel image.

The process then returns from step S117 to step 103 and the control section 31 fetches information for tuning to the next channel (channel CH(i+1) as seen from channel CHi) from the memory section 33 and repeats the processing from step S103.

If the determination in step S115 is that effective digital TV broadcast data has been obtained, the process advances to step S118 and the control section 31 rewrites the equalizer coefficient data in the coefficient memory section 331 of the nonvolatile memory 33 by substituting in the data the new equalizer coefficients obtained in step S113.

Subsequently to step S118, the control section 31 performs, in the background of digital TV broadcast reception, preliminary reception processing in the analog TV broadcast receiver 10 shown as steps S119 to S122 in FIG. 5. In step S119, the control section 31 fetches from the channel map memory section 332 the marker bit for the channel CH(i+1) to be next identified in up channel-scan tuning. In step S120, the control section 31 makes a determination as to whether the marker bit designates analog TV broadcasting.

If the determination in step S120 is that the marker bit does not designate analog TV broadcasting, the process returns to step S119 and the control section 31 fetches the marker bit for the further next channel. These steps are repeated until the marker bit designating analog TV broadcasting is recognized.

If the determination in step S120 is that the marker bit designates analog TV broadcasting, the process advances to step S121 and the control section 31 fetches PLL data of the next channel CH(i+1) from the nonvolatile memory 33. In step S122, the control section 31 sends the fetched PLL data to the analog tuner section 11 and makes the analog TV broadcast receiver 10 perform preliminary reception, thereby finishing this tuning processing routine.

Figure 6:
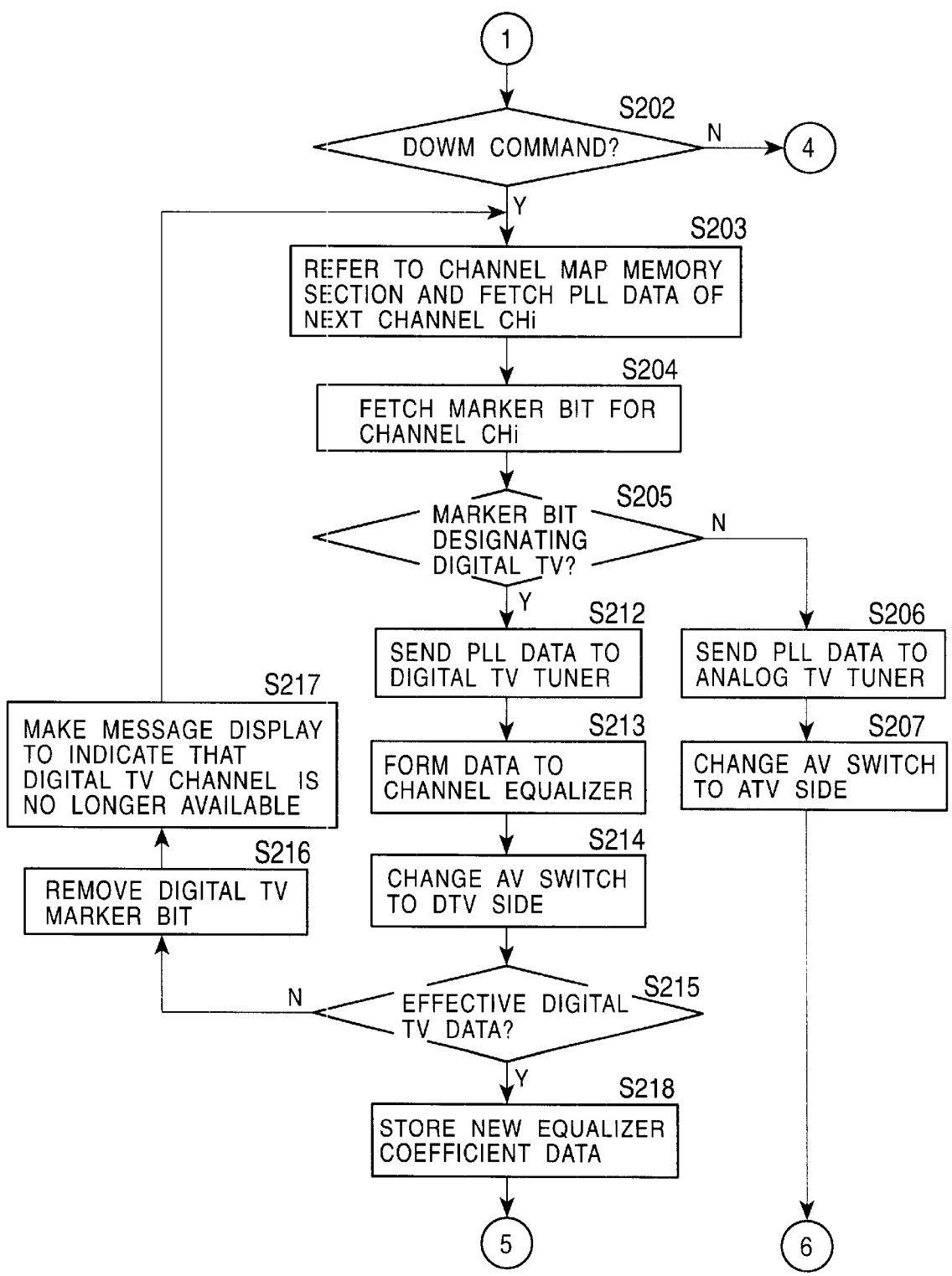
FIG. 6 is a portion of the flowchart of the tuning processing routine in the receiving apparatus of the first embodiment.

If the determination in step S102 of FIG. 4 is that the tuning command is not an up command, the process advances to step S202 of FIG. 6 and the control section 31 makes a determination as to whether the tuning command is a channel-scan-tuning down command. If the tuning command is a down command, the process advances to step S203 and the control section 31 fetches PLL data of the next channel CHi designated by the down command. In step S204, the control section 31 fetches the marker bit for the channel CHi from the channel map memory section 332 of the nonvolatile memory 33.

In step S205, the control section 31 makes a determination as to whether the marker bit designates digital TV broadcasting. If the market bit does not designate digital TV broadcasting, that is, the marker bit designates analog TV broadcasting, the process advances to step S206 and the control section 31 sends PLL data to the analog tuner section 11. In step S207, the control section 31 changes each of the switch circuits 41 and 42 to the input terminal ATV side.

Figure 7:
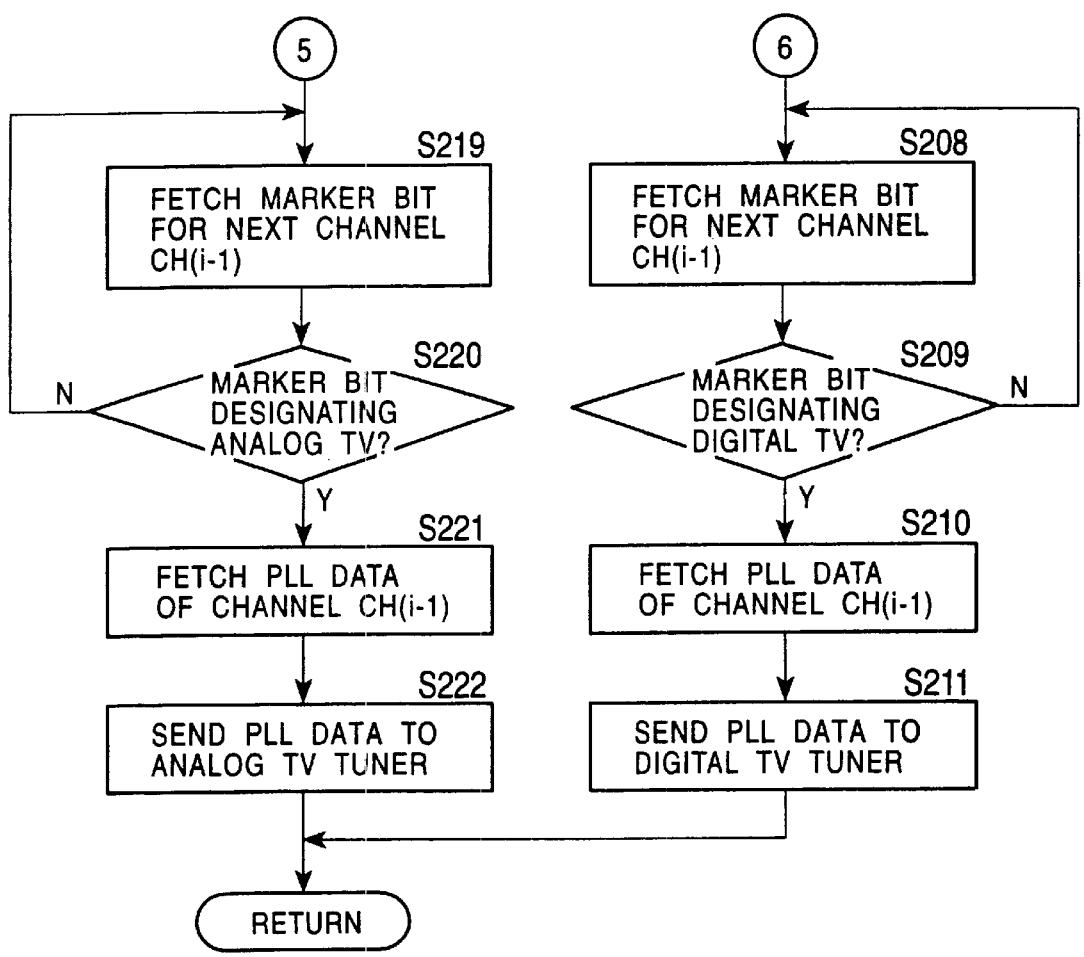
FIG. 7 is a portion of the flowchart of the tuning processing routine in the receiving apparatus of the first embodiment.

Subsequently to step S207, the control section 31 performs, in the background of analog TV broadcast reception, preliminary reception processing in the digital TV broadcast receiver 20 shown as steps S208 to S211 in FIG. 7. In step S208, the control section 31 fetches from the channel map memory section 332 the marker bit for the channel CH(i−1) to be next identified in down channel-scan tuning. In step S209, the control section 31 makes a determination as to whether the marker bit designates digital TV broadcasting.

If the determination in step S209 is that the marker bit does not designate digital TV broadcasting, the process returns to step S208 and the control section 31 fetches the marker bit for the further next channel (channel CH(i−2) as seen from channel CHi). These steps are repeated until the marker bit designating digital TV broadcasting is recognized.

If the determination in step S209 is that the marker bit designates digital TV broadcasting, the process advances to step S210 and the control section 31 fetches PLL data of the next channel CH(i−1) from the nonvolatile memory 33. In step S211, the control section 31 sends the fetched PLL data to the digital tuner section 21 and makes the digital TV broadcast receiver 20 perform preliminary reception, thereby finishing this tuning processing routine.

If the determination in step S205 is that the marker bit designates digital TV broadcasting, the process advances to step S212 and the control section 31 sends PLL data to the digital tuner section 21. In step S213, the control section 31 fetches the equalizer coefficient data for the present channel from the coefficient memory section 331 and computes new suitable equalizer coefficients by using this coefficient data and learning information obtained from received information. In step S214, the control section 31 changes each of the switch circuits 41 and 42 to the input terminal DTV side.

In step S215, the control circuit 31 makes a determination as to whether effective digital TV broadcast data has been obtained. If the result of this determination is that no effective digital TV broadcast data has been obtained, the process advances to step S216 and the control section 31 erases the marker bit for the present channel in the channel map memory section 332.

In step S217, the control section 31 displays on the screen of the display 43 a message that the present digital TV broadcasting channel is no longer available. The process returns from step S217 to step 203 and the control section 31 fetches information for tuning to the next channel from the memory section 33 and repeats the processing from step S203.

If the determination in step S215 is that effective digital TV broadcast data has been obtained, the process advances to step S218 and the control section 31 rewrites the equalizer coefficient data in the coefficient memory section 331 of the nonvolatile memory 33 by substituting in the data the new equalizer coefficients obtained in step S213.

Subsequently to step S218, the control section 31 performs, in the background of digital TV broadcast reception, preliminary reception processing in the analog TV broadcast receiver 10 shown as steps S219 to S222 in FIG. 7. In step S219, the control section 31 fetches from the channel map memory section 332 the marker bit for the channel CH(i−1) to be next identified in down channel-scan tuning. In step S220, the control section 31 makes a determination as to whether the marker bit designates analog TV broadcasting.

If the determination in step S220 is that the marker bit does not designate analog TV broadcasting, the process returns to step S219 and the control section 31 fetches the marker bit for the further next channel (channel CH(i−2) as seen from channel CHi). These steps are repeated until the marker bit designating analog TV broadcasting is recognized.

If the determination in step S220 is that the marker bit designates analog TV broadcasting, the process advances to step S221 and the control section fetches PLL data of the next channel CH(i−1) from the nonvolatile memory 33. In step S222, the control section 31 sends the fetched PLL data to the analog tuner section 11 and makes the analog TV broadcast receiver 10 perform preliminary reception, thereby finishing this tuning processing routine.

If the determination in step S202 of FIG. 6 is that the tuning command is not a down command, the process moves to step S301 and the control section 31 determines that the tuning command is a direct tuning command, and searches for the channel designated by the tuning command. The control section 31 makes a determination as to whether there is an entry in the channel map of the channel designated in step S302. If the control section 31 recognizes an entry of the channel, it makes a determination in step S303 as to whether the marker bit designates digital broadcasting.

If the marker bit does not designate digital TV broadcasting, that is, the marker bit designates analog TV broadcasting, the process advances to step S304 and the control section 31 fetches PLL data of the present channel and sends the PLL data to the analog tuner section 11. In step 305, the control section changes each of the switch circuits 41 and 42 to the input terminal ATV side, thereby finishing this tuning routine.

If the determination in step S303 is that the marker bit designates digital TV broadcasting, the process advances to step S306 and the control section 31 fetches PLL data of the present channel and sends the PLL data to the digital tuner section 21. In step S307, the control section 31 fetches equalizer coefficient data of the channel from the coefficient memory 331 and computes new suitable equalizer coefficients by using this coefficient data and learning information obtained from received information. In step S308, the control section 31 changes each of the switch circuits 41 and 42 to the input terminal DTV side.

In step S309, the control circuit 31 makes a determination as to whether effective digital TV broadcast data has been obtained. If the control section determines that no effective digital TV broadcast data has been obtained, it executes an error processing routine in step S311. If the determination in step S309 is that effective digital TV broadcast data has been obtained, the process advances to step S310 and the control section 31 the equalizer coefficient data in the coefficient memory section 331 of the nonvolatile memory 33 by substituting in the data the new equalizer coefficients obtained in step S307, thereby finishing this tuning processing routine.

Figure 8:
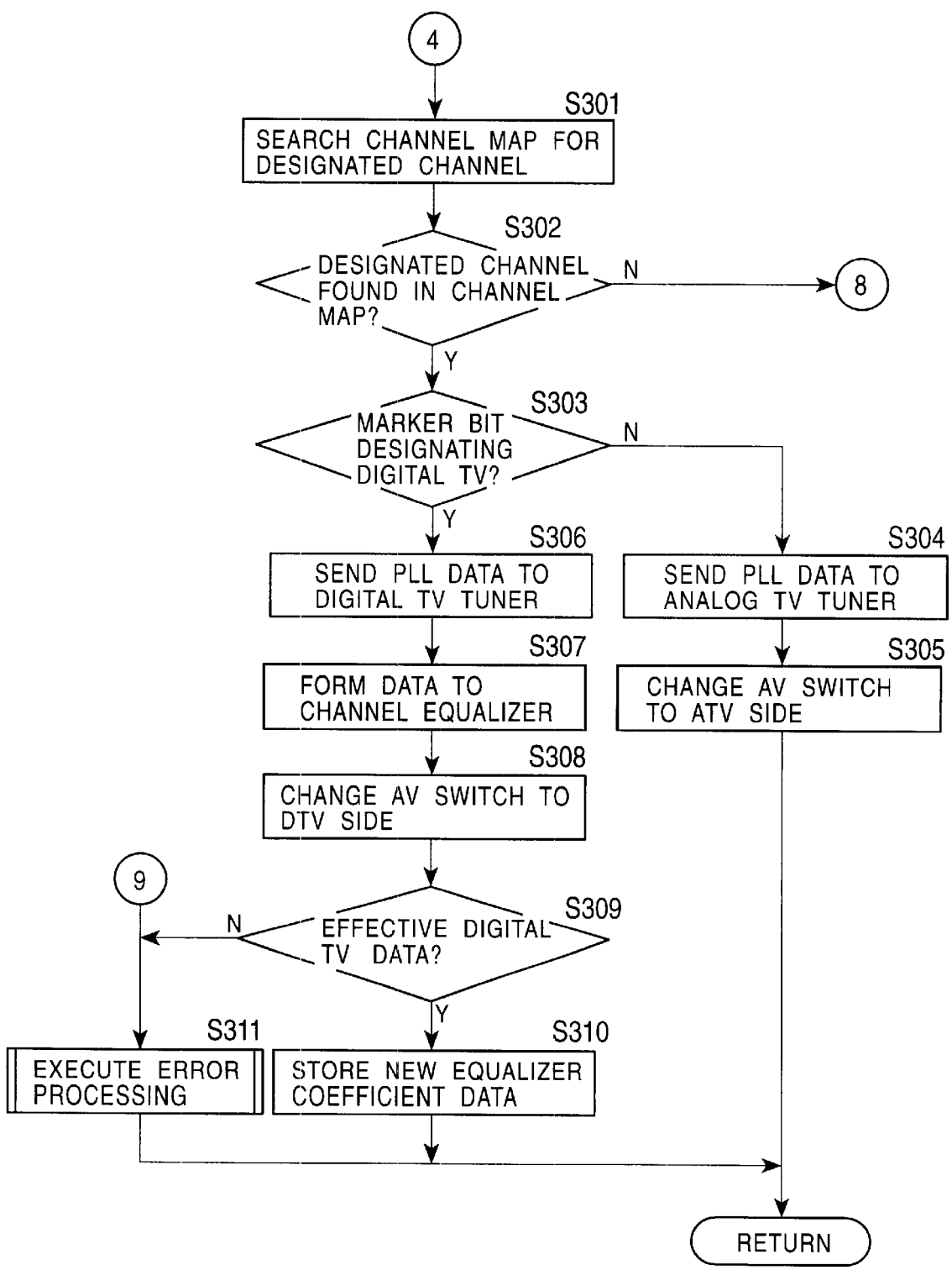
FIG. 8 is a portion of the flowchart of the tuning processing routine in the receiving apparatus of the first embodiment.
Figure 9:
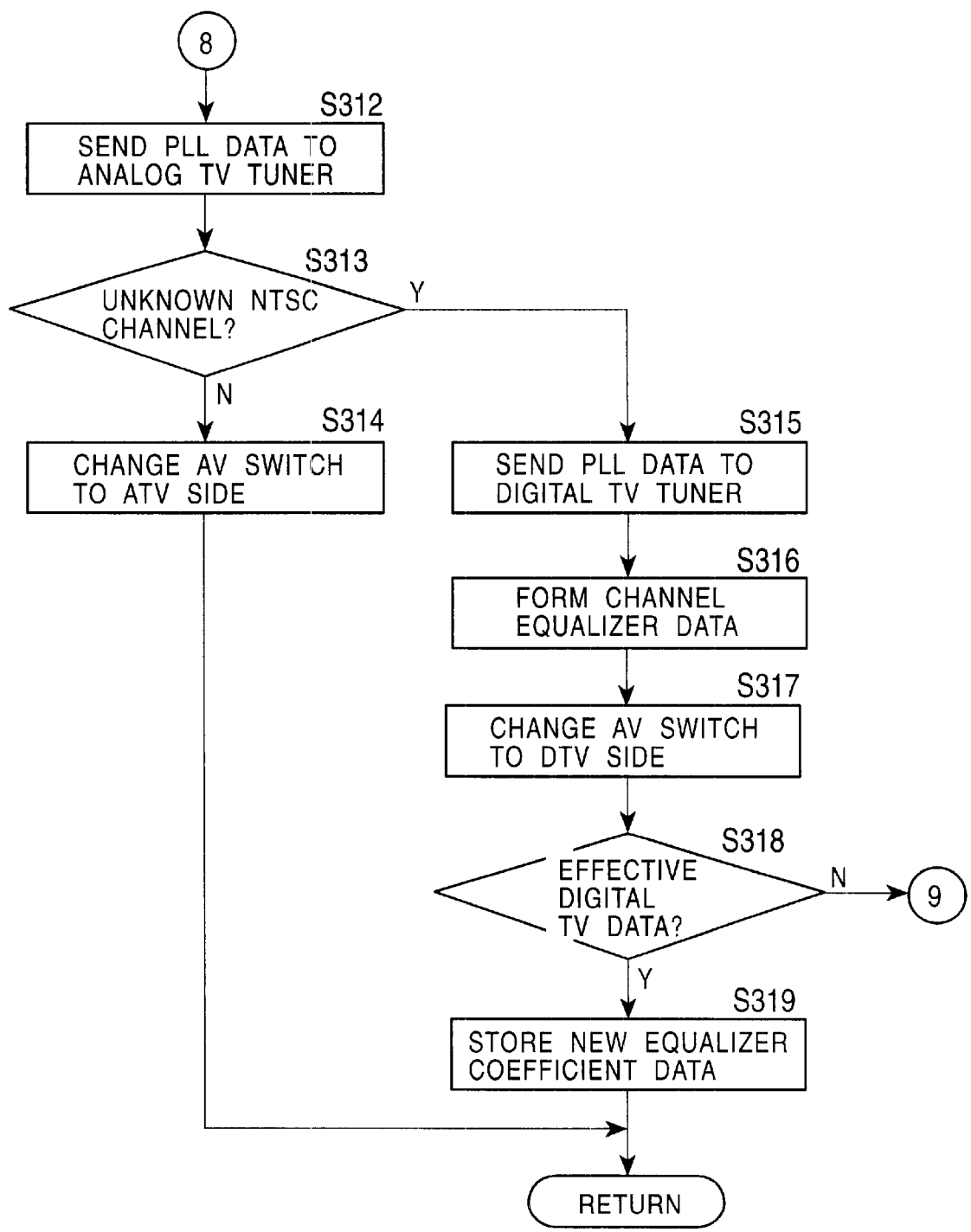
FIG. 9 is a portion of the flowchart of the tuning processing routine in the receiving apparatus of the first embodiment.

If the determination in step S302 of FIG. 8 is that there is no entry in the channel map of the channel to which direct turning is to be performed. The process moves to step S312 shown in FIG. 9 and the control section 31 fetches PLL data for selecting the channel and sends the PLL data to the analog tuner section 11. In step S313, the control section makes a determination as to whether the present channel is an unknown NTSC channel. If No, the process advances to step S314 and the control section 31 changes each of the switch circuits 41 and 42 to the input terminal ATV side, thereby finishing this tuning routine.

If the determination in step S313 is that the designated channel is an unknown NTSC channel, the process advances to step S315 with the designated channel assumed to be a digital TV broadcasting channel. In step S315, the control section 31 fetches PLL data of the channel and sends the PLL data to the digital tuner section 21. In step S316, the control section 31 fetches equalizer coefficient data of the channel from the coefficient memory section 331 and computes new suitable equalizer coefficients by using this coefficient data and learning information obtained from received information. In step S317, the control section 31 changes each of the switch circuits 41 and 42 to the input terminal DTV side.

In step S318, the control section 31 makes a determination as to whether effective digital TV broadcast data has been obtained. If the control section 31 determines that no effective digital TV broadcast data has been obtained, it executes the error processing routine in step S311. If the determination in step S318 is that effective digital TV broadcast data has been obtained, the process advances to step S319 and the control section 31 rewrites the equalizer coefficient data in the coefficient memory section 331 of the nonvolatile memory 33 by substituting in the data the new equalizer coefficients obtained in step S316, thereby finishing this tuning processing routine.

Figures 10, 11:
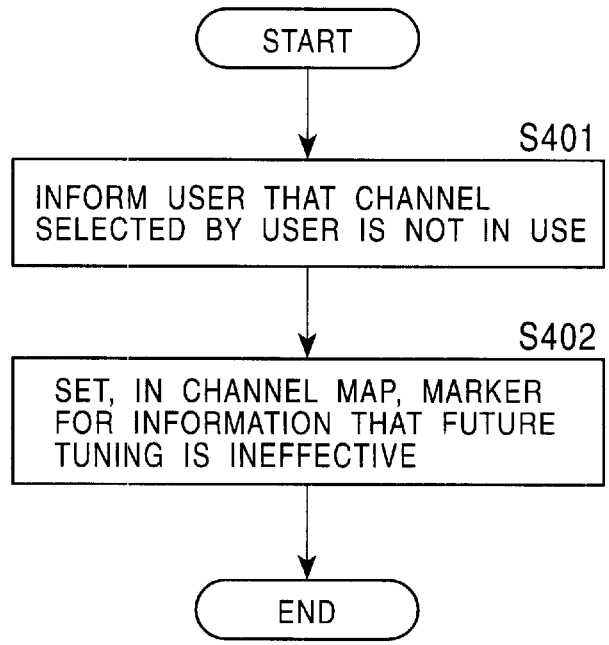
FIG. 10 is a portion of the flowchart of the tuning processing routine in the receiving apparatus of the first embodiment.
FIG. 11 is a diagram showing an example of the contents of a channel map memory.

FIG. 10 shows the error processing routine in step S311. In step S401 of this routine, the control section 31 informs the user that the channel selected by the user is not in use by a certain means, e.g., the method of displaying a message on the screen by using the OSD function. In step S402, the control section 31 writes in the channel map a marker for information that future tuning to the channel is ineffective, thereby finishing this error processing routine.

In the first embodiment of the present invention described above, ghost cancellation equalizer coefficients supplied to the channel equalizer 223 at the time of tuning to a digital TV broadcast are newly generated by using equalizer coefficients obtained in the past. The equalizer coefficient generation time in this process is shorter than that in the process of obtaining equalizer coefficients by newly performing learning.

The proportion of the time required for computation of equalizer coefficients in the delay time of tuning to a digital TV broadcast is considerably large. According to the first embodiment, therefore, the delay time of to a digital TV broadcast can be reduced.

In the first embodiment, the marker bit for enabling each of a plurality of channels to be identified as an analog TV broadcasting channel or a digital TV broadcasting channel is stored as a channel map content in the nonvolatile memory. One of the channels designated by a tuning command can be identified as, an analog TV broadcasting channel or a digital TV broadcasting channel by referring to the corresponding marker bit, thereby enabling a suitable one of the analog tuner section 11 or the digital tuner section 21 to be immediately selected. This contributes to the reduction in the tuning delay time in the receiving apparatus capable of receiving both analog and digital TV broadcasts.

When an analog TV broadcasting channel is selected, preliminary reception of a digital TV broadcasting channel which is most probable to be next selected is performed in the background of reception of the selected channel. Also, when a digital TV broadcasting channel is selected, preliminary reception of an analog TV broadcasting channel which is most probable to be next selected is performed in the background of reception of the selected channel. The delay time when the anticipated channel is actually selected can be minimized by performing the preliminary reception.

In particular, in the first embodiment, a channel most probable to be next selected when a channel-scan tuning up or down command is issued is preliminarily received as a channel next to the designated channel. In the channel scan mode, therefore, the time period between the moment at which a command is input and the moment at which an image output and/or an audio output are obtained can be remarkably reduced.

In the above-described embodiment, the receiving apparatus has an analog tuner section and a digital tuner section such as to be able to receive analog and digital TV broadcasts. However, the method of performing preliminary reception of a channel different from an actually selected channel in the background of reception of the selected channel can also be applied to a digital TV broadcast receiving apparatus having a plurality of digital tuner sections. In such a receiving apparatus having a plurality of digital tuner sections, programs broadcast by a plurality of programs can be displayed as main and sub images or multiple images in parallel with each other.

While the method of constantly updating equalizer coefficients in the coefficient memory section 331 has been described, a different method may alternatively be used in which roughly set values are written in the coefficient memory section 331, for example, when the apparatus is placed in a user's house and set up, the equalizer coefficients being maintained without being updated, and in which suitable coefficient values are computed based on the coefficient information stored in the coefficient memory section 331 when needed.

This method may also be such that, by considering temperature characteristics of the front end section 22 of the digital TV broadcast receiver 20, equalizer coefficients determined by being related to a plurality of temperatures are stored in the coefficient memory section 331 with respect to each channel, and the equalizer coefficients corresponding to a temperature sensed by a temperature sensor are read out from the coefficient memory section 331 to be used for computation of suitable equalizer coefficients under the temperature condition.

In the above-described first embodiment, during the delay time between the moment at which a tuning command is input and the moment at which a video output and/or an audio output in the channel designated by the tuning command are obtained, outputting of, for example, images and sounds is inhibited to avoid reproduction of a distorted image or noise.

Modifications of First Embodiment
(Modification 1)

In the above-described method of setting marker bits, marker bits in the channel map memory section 332, for enabling each of a plurality of channels to be identified as a digital TV broadcasting channel or an analog TV broadcasting channel, are previously set at the time of manufacture or shipping from a factory designating, or marker bits are set by performing reception of each channel at the time of setup and by identifying the broadcasting system from the reception result. Alternatively, the broadcasting system with respect to each channel may be detected to set the marker bit for the channel when the channel is first received during use of the receiving apparatus.

However, the state of channel mapping is unfixed before completion of change from the present analog TV broadcasting to digital TV broadcasting. It is possible that many channels will disappear, some of them will appear again, and channels will be transferred between analog TV broadcasting and digital TV broadcasting.

Therefore, the contents of channel map memory section 332 set at the time of manufacture or factory shipping or set by automatic channel allocation at the time of setup may become incorrect, and tuning errors may result. In such an event, each of analog TV broadcasts and digital TV broadcasts is identified after being received, as described above. In particular, with respect to a digital TV broadcasting channel, a considerably long time is required for decoding.

In this modification, to solve this problem, program information about both analog and digital TV broadcasts is included in electronic program guide (EPG) information transmitted by being multiplexed in a digital TV broadcast, and information for enabling each of a plurality of channels to be identified as an analog TV broadcasting channel or digital TV broadcasting channel is also included.

Only one-bit identification information may suffice if only discrimination between analog TV broadcasting and digital TV broadcasting is made. In the receiving apparatus, EPG data is extracted from a received broadcast signal, and the identification bit is also extracted from the extracted PEG data to be stored as a marker bit in the channel map memory section 332.

In a future broadcasting system, however, broadcasting may be performed using different modulation methods for modulation in a plurality of channels. In this modification of the first embodiment of the present invention, by considering this condition, a plurality of bits are used as the above-mentioned identification information to identify a plurality of possible modulation methods.

FIG. 11 is a table showing the contents of 2-bit identification information included as marker bits in EPG data by considering possible modulation methods.

That is, two marker bits "00" denote NTSC modulation in analog TV broadcasting. Broadcast signals formed by this NTSC modulation are distributed by ground wave TV broadcasting and cable TV broadcasting.

Two marker bits "01" denote digital TV broadcasting using 8-value vestigial side band (VSB) or 16-value VSB modulation. Broadcast signals formed by this modulation are distributed by ground wave TV broadcasting.

Two marker bits "10" denote digital TV broadcasting using quadrature amplitude modulation (QAM). Broadcast signals formed by this modulation are distributed by cable TV broadcasting.

Two marker bits "11" denote digital TV broadcasting using quadrature phase shift keying (QPSK). Broadcast signals formed by this modulation are distributed by satellite TV broadcasting.

Needless to say, while an example of use of a set of two marker bits is shown in FIG. 11, the number of marker bits may be increased if there is a need for identifying five or more modulation methods.

In a case where broadcasting is performed by including marker bits for identification of each of a plurality of channels in EPG data, marker bits in a channel map stored in the channel map memory section 332 is updated, for example, when the EPG data is obtained.

Figure 12:
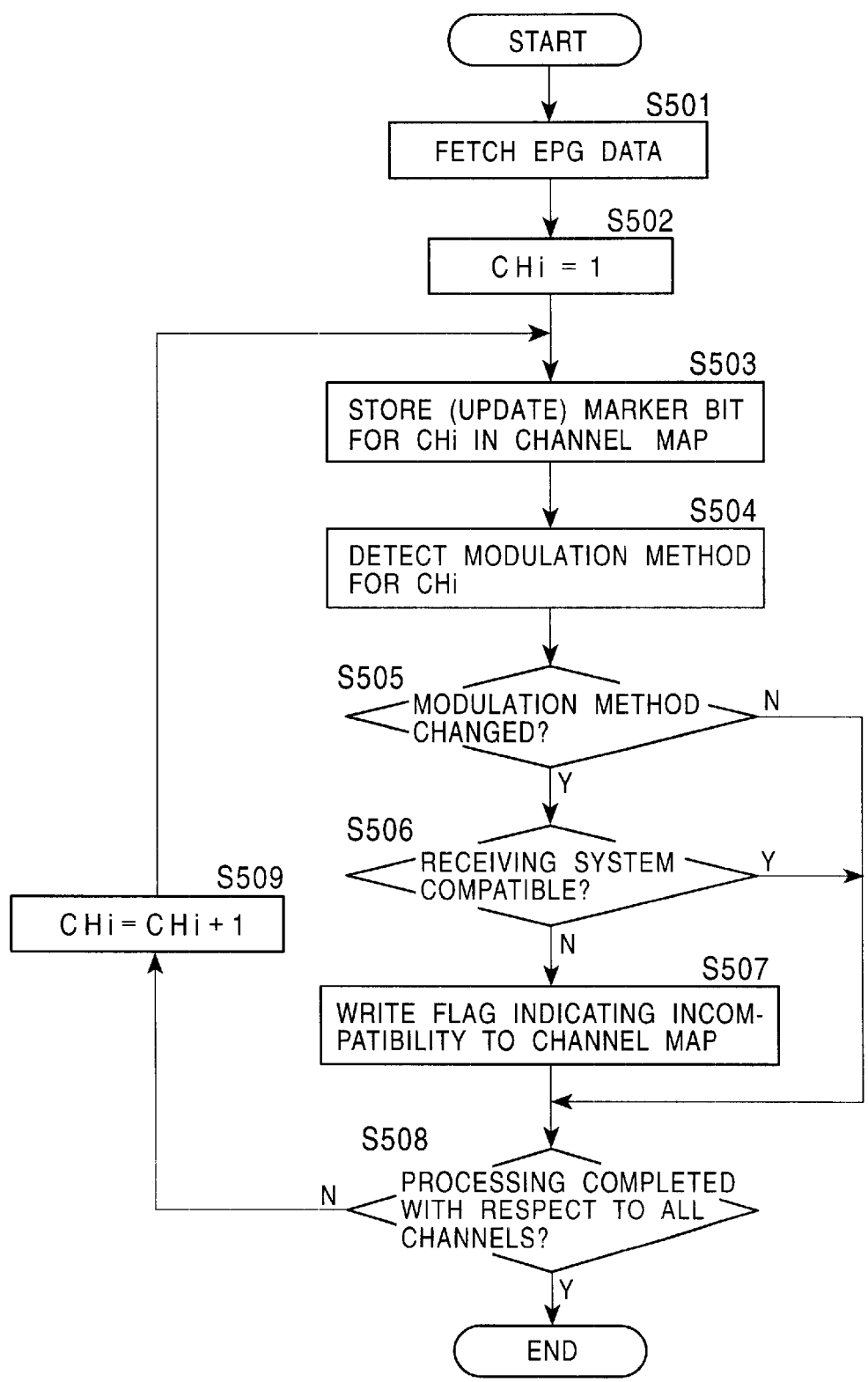
FIG. 12 is a flowchart of processing for writing marker bits to the channel map.

FIG. 12 shows an example of a flowchart showing the process of updating a channel map stored in the channel map memory 332.

The control section 31 first obtains EPG data by extracting it from the transport section 23 in step S501. Also, the control section 31 forms data for displaying an electronic program guide on the display screen in the above-described manner. The control section 31 first forms a channel map containing all channels designated by the EPG, and thereafter executes processing from step S502 to rewrite the channel map.

In step S502, the control section 31 designates a first channel. In step S503, the control section 31 compares the marker bits for the channel CHi in the channel map stored in the channel map memory section 332 with the marker bits newly obtained from the EPG, and the updates the marker bits for the present channel by substituting the marker bits newly obtained from the EPG for the marker bits in the channel map if there is a difference between the two sets of marker bits. Instead of updating upon comparison, automatic rewriting according to the marker bits newly obtained from the EPG may be performed.

In step S504, the control section 31 recognizes the channel CHi modulation method. In step S505, the control section 31 makes a determination as to whether the modulation method has been changed. If the modulation method has not been changed, the process moves to step S508 and the control section 31 makes a determination as to whether the processing has been completed with respect to all the channels. If No, the control section 31 designates the next channel and repeats step 503 and the other subsequent steps.

If the determination in step S505 is that the modulation method has been changed, the control section 31 then makes a determination as to whether the receiving apparatus is compatible with the changed modulation method. If Yes, the process skips to step S508. If No, the process advances to step S507 and then to step S508. In step S507, the control section 31 stores, in the channel map, a flag indicating that the channel contains signals formed by the modulation method with which the receiving apparatus is not compatible, the flag being added to the information about the channel.

If the determination in step S508 is that the above-described rewriting has been completed with respect to all the channels with the EPG, this channel map updating routine is finished.

If a user selects the channel with which. the flag written in step S507 is set, the user can given a displayed message that signals in the selected channel cannot be received because they were formed by the modulation method with which decoding cannot be performed by the receiving apparatus. Also, up or down channel-scan tuning may be executed by skipping the channel with which the flag is written.

In this embodiment, as described above, EPG data is used and marker bits are assigned to each of the channels in the channel map and are updated. The marker bits can be easily added and channel map information correctly formed in accordance with the latest channel allocation can always be stored in the channel map memory section 332. As a result, the possibility of tuning errors under the above-mentioned circumstances is reduced.

While the process in which a channel map is updated each time the EPG is displayed has been described, the arrangement may alternatively be such that means for inputting a command to perform channel map updating only when a user wants to update the channel map is provided in the user interface, and the control section 31 receives the command and update the channel map by using the EPG.

The process has also been described with respect to the case where a digital TV broadcast signal with an EPG including marker bits is broadcast. However, it is possible that an EPG will also be superposed on an analog TV broadcast signal.

Preferably, EPG information, superposed on a broadcast signal of digital TV broadcasting or analog TV broadcasting, contain guide information and marker bit information about all digital and analog broadcasting channels. If EPG information in each of digital and analog TV broadcasts has only guide and marker bit information about the corresponding channel added thereto, a channel map about all the analog and digital TV broadcasting channels may be formed by using the EPGs superposed on analog and digital broadcast signals, and may be stored in the memory section 332.

Needless to say, marker bits may be transmitted as special additional information in each channel instead of being added to the EPG.

(Modification 2)

In the above-described first embodiment, channels close to a channel to which the receiving apparatus is tuned during up or down channel-scan tuning are preliminarily received, and tuning is performed not only to the adjacent channel but also to other channels successively scanned. Needless to say, only the next channel in the up or down direction may be set as an object of preliminary reception.

Figure 13:
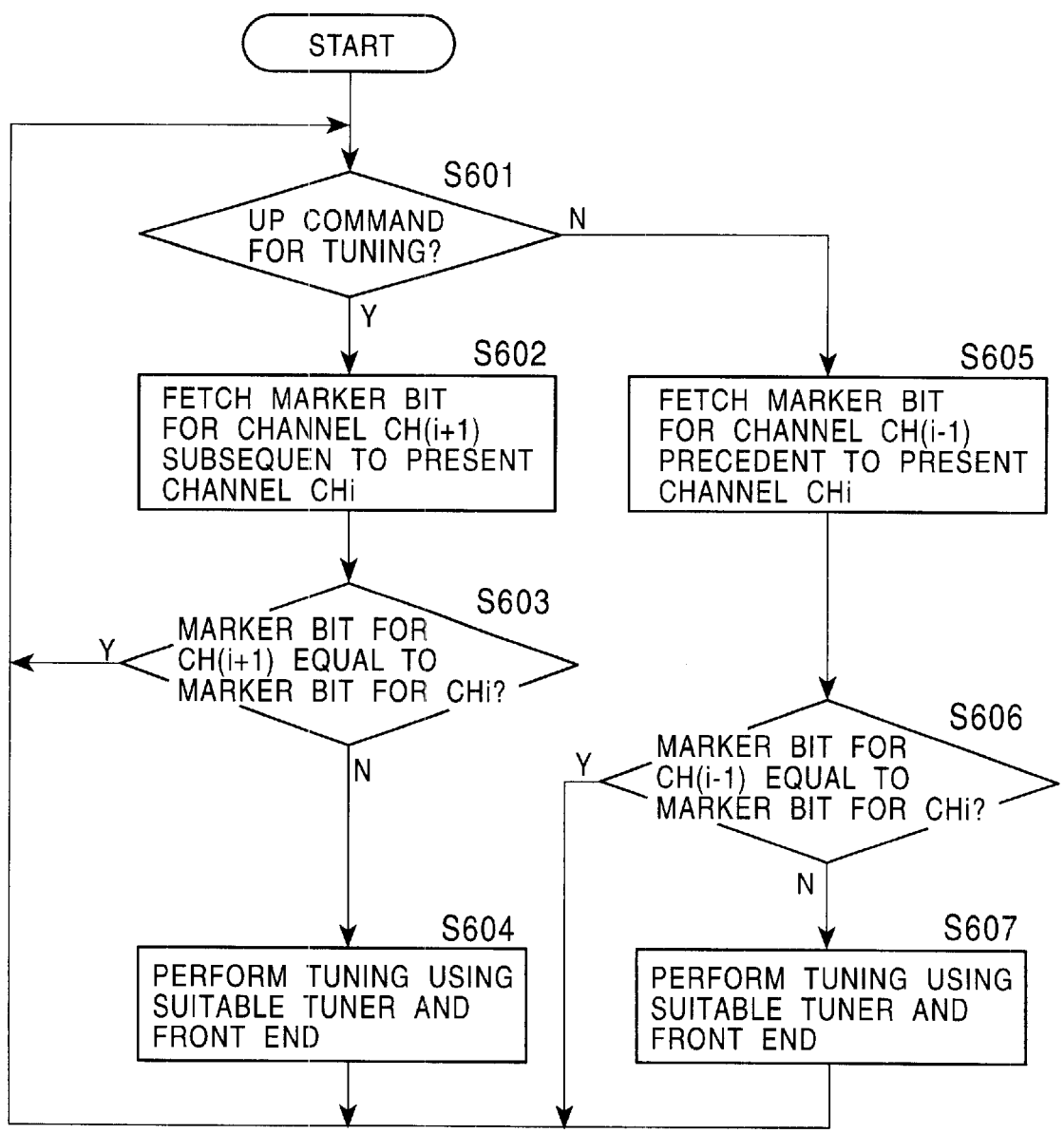
FIG. 13 is a flowchart of another example of the tuning processing routine in the receiving apparatus of the first embodiment.

FIG. 13 is a flowchart for outlining preliminary reception processing performed in this manner. The process shown in this flowchart is started when tuning is performed by using a channel-scan key. This modification of the embodiment will be described by assuming that a channel map is formed in accordance with the above-described modification 1.

First, in step S601, the control section 31 makes a determination as to whether tuning to the present channel CHi is performed by an up command. If Yes, the control section 31 fetches, in step S602, the marker bits for the channel CH(i+1) next to the present channel CHi. In step S603, the control section 31 makes a determination as to whether the marker bits for the channel CH(i+1) and the marker bits for the channel CHi are equal to each other. If Yes, the process returns to step S601 without performing processing. If No, the process advances to step S604.

In step S604, the control section 31 selects the suitable tuner and front end not presently used for channel reception and executes preliminary reception. Thereafter, the process returns to step S601.

If the determination in step S601 is that tuning is performed not by an up command but by a down command, the process moves to step S605 and the control section 31 fetches the marker bits for the channel CH(i−1) precedent to the present channel CHi. In step S606, the control section 31 makes a determination as to whether the marker bits for the channel CH(i−1) and the marker bits for the channel CHi are equal to each other. If Yes, the process returns to step S601 without performing processing. If No, the process advances to step S607.

In step S607, the control section 31 selects the suitable tuner and front end not presently used for channel reception and executes preliminary reception. Thereafter, the process returns to step S601.

Second Embodiment

The second embodiment of the present invention is arranged to receive both analog TV broadcasts and digital TV broadcasts, as is the first embodiment. Also, the arrangement of the second embodiment is the same as that of the first embodiment in that the delay from a user's tuning command input to an actual video output/audio output is minimized by performing computation of channel equalizer coefficients, by performing preliminary reception selection in the background of a presently selected channel, and by using marker bits in channel map memory section 332.

The apparatus of this embodiment may also be provided with the same updating function as that in the modification 1 of the first embodiment, i.e., the function for updating marker bits in a channel map by using an EPG.

The second embodiment is characterized in that, to relieve viewer's irritation, an image is displayed during the waiting time, i.e., the delay time from inputting of a tuning command to outputting of an image output signal and/or an audio output signal, through which no image is displayed according to the conventional art.

Figure 14:
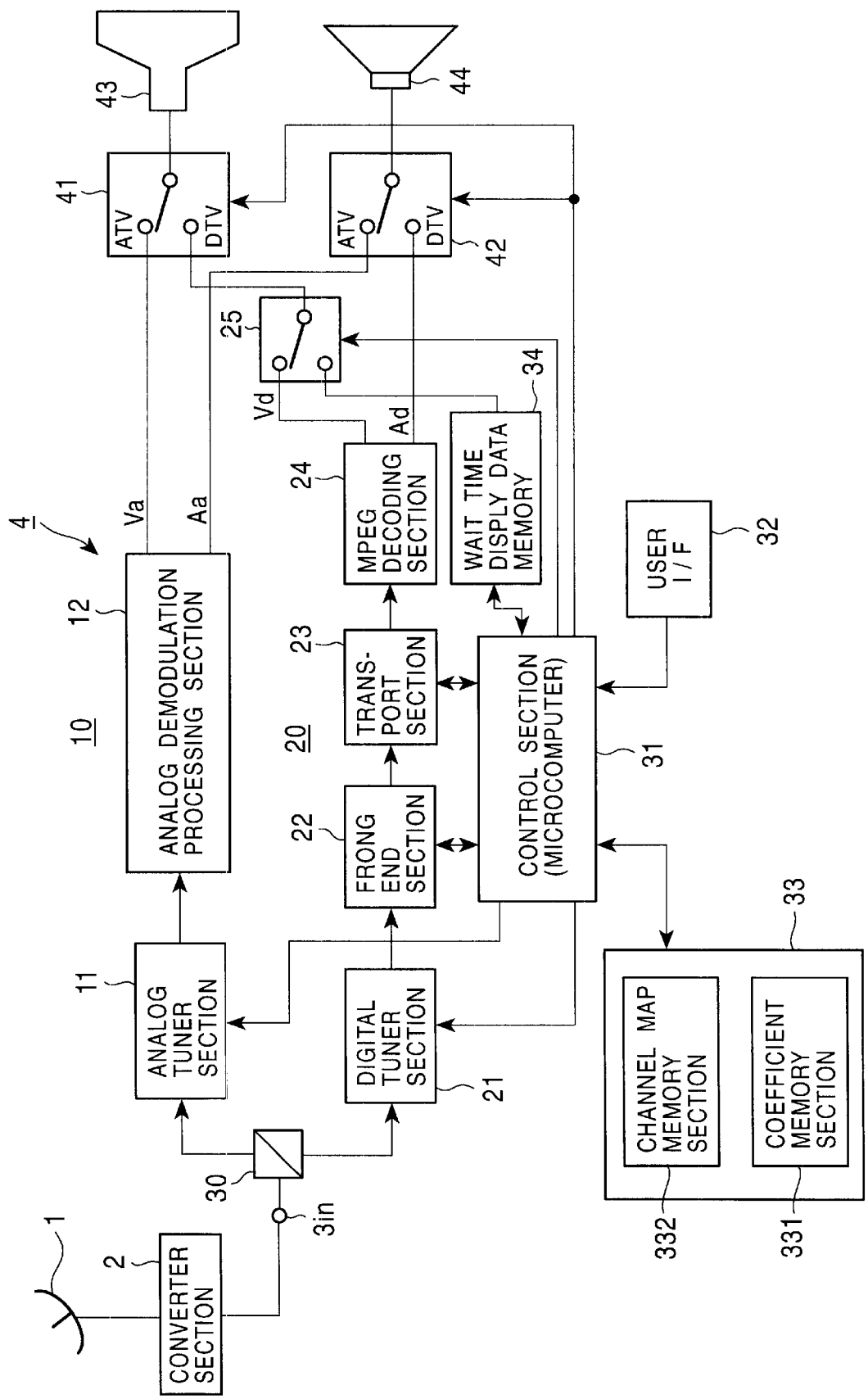
FIG. 14 is a block diagram of a receiving apparatus which represents a second embodiment of the present invention.

FIG. 14 is a block diagram of a receiving apparatus 4 which represents a second embodiment of the present invention. In FIG. 14, portions identical or corresponding to those of the first embodiment are indicated by the same reference characters.

In the second embodiment, NTSC signal output Vd from the MPEG decoding section 24 is supplied to terminal DTV of the two terminals of the switch circuit 41 via a switch circuit 25. NTSC signal output Vd from the MPEG decoding section 24 is supplied to one of two input terminals of the switch circuit 25.

A wait-time display data memory 34 is provided. Wait-time display data read out from this memory by an instruction from the control section 31 is supplied to the other input terminal of the switch circuit 25. The switch circuit 25 is set at the changeover position on the wait-time display data memory 34 side by the control circuit 31 during the delay time before a video output signal and/or an audio output signal in a channel designated by a tuning command are obtained. An output from the switch circuit is supplied to the input terminal DTV of the switch circuit 41. In other respects, the configuration is the same as that of the first embodiment.

Various images based on wait-time display data are provided in different modes. In the first mode, data of an image specially prepared as a wait-time display image is stored in the memory 34.

Figure 15A:
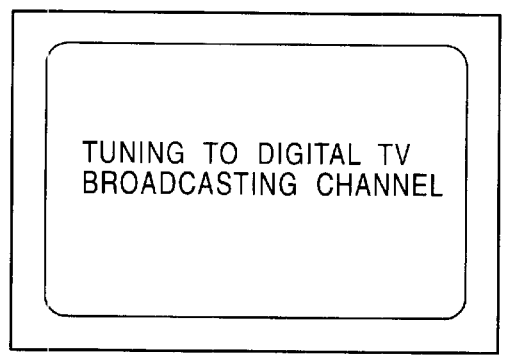
FIGS. 15A to 15C are diagrams showing examples of certain portions of the second embodiment.

FIG. 15A shows an example of wait-time display information provided in this mode. A message that the receiving apparatus is tuned to a digital TV broadcasting channel and that a signal in this channel is being received is displayed on the screen. Instead of such a message, a particular image, e.g., an image of an hourglass or some moving image may be used. A sill image such as a landscape may alternatively be used.

Figure 15B:
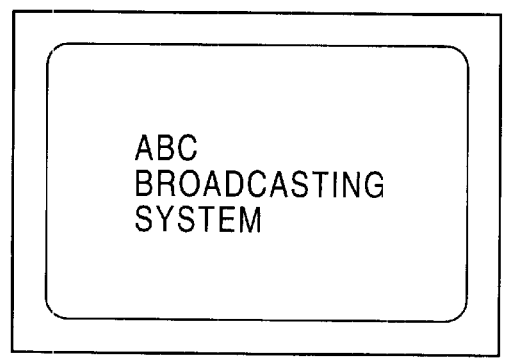

In the second mode, an image for enabling a channel selected by a tuning command to be identified is displayed as wait-time display information. For example, a logotype of a broadcasting station, such as shown in FIG. 15B, to which a channel selected by a tuning command is assigned, is displayed.

Such logotype information is previously written to the wait-time display memory 34 of the receiving apparatus 4 by being related to each channel. Needless to say, if logotype information about the corresponding broadcasting station is contained in a broadcast signal such as an EPG, the logotype information may be extracted and written to the memory 34.

In the case of using the second mode, a user can confirm through such a wait-time display image that tuning to a channel which he or she has selected is completed, so that user's irritation can be reduced even if the delay time is comparatively long.

Figure 15C:
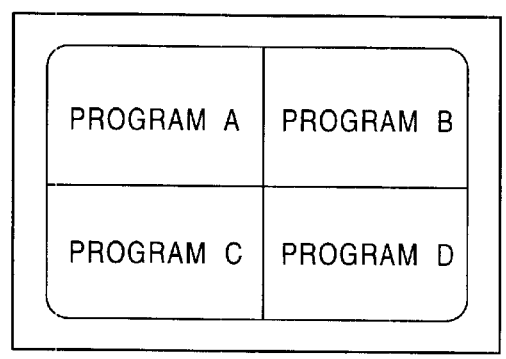

In the third mode, information about programs received in the past in each of digital TV broadcasting channels are written to the wait-time display memory 34, and program information about one of the channels designated by a tuning command is read out from the memory 34 to be displayed as wait-time display information. Four example, in a case where four programs have been broadcast, information about four programs is displayed on the screen, as shown in FIG. 15C.

That is, in the case of digital broadcasting, four programs, for example, can be provided in an SDTV broadcast while only one program can be provided in an HDTV broadcast, and display information for selection of provided programs is usually included in a broadcast signal. Such display information for selection of provided programs may be written to the wait-time display memory 34 to make a wait-time display such as shown in FIG. 15C.

If the third mode is used, a user can previously know programs selectable in a-selected digital TV broadcasting channel. The function obtained in this manner is convenient. It is thought that, with respect to one digital TV broadcasting channel, provided programs are not frequently changed.

In the second embodiment, as described above, a wait-time image is displayed through the time period from inputting of a tuning command to outputting of an image and/or sound in a selected channel, thereby relieving a user of irritation even during a comparatively long waiting period.

The arrangement of the second embodiment can also be applied to a receiving apparatus having a plurality of digital tuner sections. That is, a switch circuit for displaying a wait-time image instead of a main video signal for the period corresponding to the delay time is provided in the output line of each digital tuner section. In such a case, wait-time display memory 34 may be used in common with respect to the outputs from the digital tuner sections instead of being provided for each output.

Third Embodiment

In the above-described second embodiment, a wait-time image from wait-time display data memory 34 is displayed for the time period corresponding to the delay time from inputting of a tuning command to outputting of an image and/or sound. However, the arrangement may alternatively be such that, for example, when a user changes channels from analog TV broadcasting to digital TV broadcasting, displaying an analog TV broadcast image is continued and the analog TV broadcast image is replaced with a digital TV broadcast image after the receiving apparatus has become able to normally display a digital TV broadcast image. Under such a condition, there is a risk of the user thinking that the receiving apparatus has gone wrong because display of the analog TV broadcast is continued after the apparatus has been changed to display the digital TV broadcast. Then a message that tuning for reception of the digital broadcast channel is being performed may be superposed on the analog TV broadcast image, thereby informing the user that the apparatus is operating normally. In comparison with displaying no image, continuing displaying the image is more advantageous because of the effect of relieving user's irritation.

The embodiments of the present invention have been described with respect to a satellite broadcast receiving system. However, each of the receiving apparatuses 3 or 4 can, of course, be arranged as a cable TV broadcast receiving apparatus.

According to the present invention, as described above, the delay time of processing for turning for receiving a digital TV broadcast, which is longer than that in the case of tuning to an analog TV broadcast, can be reduced substantially largely and a feeling of being kept waiting can be reduced.

What is claimed is:

1. An apparatus for receiving television broadcasts, comprising:

a tuner section for selecting one carrier from an input signal;

a front end section for demodulating said carrier selected by said tuner section, said front end section having a channel equalizer formed of a digital filer and producing a transport stream;

a transport section for separating a desired channel from said transport stream;

a decoding section for decoding said signal of said desired channel to obtain at least one of an output video signal and an output audio signal;

a coefficient memory for storing equalizer coefficients for a plurality of channels to be supplied to said digital filter of said channel equalizer; and control means for generating equalizer coefficients to be supplied to said channel equalizer based on at least some of said equalizer coefficients in said coefficient memory.

2. An apparatus according to claim 1, wherein said control means updates the equalizer coefficients stored in said coefficient memory by using equalizer coefficients newly generated.

3. An apparatus according to claim 1, further comprising means for supplying a predetermined wait-time video signal to said display section for a time period before an output video signal is obtained from said decoding section.

4. An apparatus according to claim 1, wherein an image for identification of the selected desired channel is displayed by said display section for a time period before an output video signal is obtained from said decoding section.

5. An apparatus according to claim 1, further comprising storage means for storing program information previously provided in the same channel as said desired channel, wherein said program information previously provided in said desired channel and read output from said storage means is displayed by said display section for a time period before an output video signal is obtained from said decoding section.

6. An apparatus for receiving television broadcasts, comprising:

a first tuner section for receiving one of a plurality of digital television broadcasts, said first tuner section selecting one carrier from an input signal and producing an output signal;

a digital demodulation processing section for obtaining an output video signal and an output audio signal by demodulating said output signal from said first tuner section, by separating a desired channel, and by performing decoding;

a second tuner section for receiving one of a plurality of analog television broadcasts, said second tuner section selecting one carrier from said input signal and producing an output signal;

an analog demodulation processing section for obtaining an output video signal and an output audio signal in a desired channel by demodulating said output signal from said second tuner section;

means for making a changeover between selecting said output video signal and said output audio signal from said digital demodulation processing section for use as reception outputs, and for selecting said output video signal and said output audio signal from said analog demodulation processing section for use as said reception outputs;

a channel map memory for storing identification information for enabling each selectable channel to be identified as a digital television broadcasting channel or an analog television broadcasting channel; and means for making a determination as to whether a channel selected by a user is a digital television broadcasting channel or an analog television broadcasting channel based on said identification information from said channel map memory, for supplying a tuning control signal to a corresponding one of said first tuner section and said second tuner section, and for controlling said changeover means.

7. An apparatus according to claim 6, wherein at least one of said analog television broadcast signal and said digital television broadcast signal contains guide information for presenting to a viewer one of a present state of broadcasting of channel programs and a schedule of broadcasting of channel programs, said guide information including a marker bit for enabling each channel to be identified as an analog broadcasting channel or a digital broadcasting channel, said apparatus further comprising:

means for extracting said guide information from said broadcast signal, and for storing, as said identification information in said channel map memory, said marker bit obtained from said extracted guide information.

8. An apparatus according to claim 6, wherein if said channel selected by said user is an analog television broadcasting channel, a control signal for selecting a carrier in said selected channel is supplied to said second tuner section, and a control signal for selecting a carrier of a digital television broadcast in a channel supposed by using said channel map memory to be next selected by said user in a vicinity of said received channel is supplied to said first tuner section.

9. An apparatus according to claim 6, wherein:

if said channel selected by said user is an analog television broadcasting channel, a control signal for selecting a carrier in said selected channel is supplied to said second turner section, and a control signal for selecting a carrier of a digital television broadcast in a channel that is predicted by using said channel map memory to be next selected by said user is supplied to said first tuner section; and if said channel selected by said user is a digital television broadcasting channel, a control signal for selecting a carrier in said selected channel is supplied to said first tuner section, and a control signal for selecting a carrier of an analog television broadcast in a channel that is predicted by using said channel map memory to be next selected by said user in a vicinity of said received channel is supplied to said second tuner section.

10. An apparatus for receiving television broadcasts, comprising:

a first tuner section for receiving one of a plurality of digital television broadcasts, said first tuner section selecting one carrier from an input signal and producing an output signal;

a digital demodulation processing section for obtaining an output video signal and an output audio signal by demodulating said output signal from said first tuner section, by separating a desired channel, and by performing decoding;

a second tuner section for receiving one of a plurality of analog television broadcasts, said second tuner section selecting one carrier from said input signal and producing an output signal;

an analog demodulation processing section for obtaining an output video signal and an output audio signal in a desired channel by demodulating said output signal from said second tuner section;

means for making a changeover between selecting said output video signal and said output audio signal from said digital demodulation processing section for use as reception outputs, and for selecting said output video signal and said output audio signal from said analog demodulation processing section for use as said reception outputs;

means for controlling said means for making a changeover according to whether a channel selected in accordance with a tuning operation performed by a user is a digital television broadcasting channel or an analog television broadcasting channel; and means for supplying a signal for receiving a broadcast signal in a channel that is predicted to be next selected by said user in a vicinity of said received channel to one of said first and second tuner sections that is currently not receiving said broadcast signal from which said output video signal and said output audio signal are used as reception outputs through said means for making a changeover.

11. An apparatus according to claim 10, wherein said digital demodulation processing section has a channel equalizer formed of a digital filter, said apparatus further comprising:

a coefficient memory for storing equalizer coefficients to be supplied to said digital filter of said channel equalizer; and control means for generating equalizer coefficients to be supplied to said channel equalizer based on said equalizer coefficients in the coefficient memory.

12. An apparatus according to any one of claims 6 to 11, further comprising means for supplying a predetermined wait-time video signal to a display section for a time period before an output video signal is obtained from said digital demodulation processing section.

13. An apparatus according to any one of claims 6 to 11, wherein an image for identification of the selected desired channel is displayed by a display section for a time period before an output video signal is obtained from said digital demodulation processing section.

14. An apparatus according to any one of claims 6 to 11, further comprising storage means for storing program information previously provided in said desired channel, wherein said program information previously provided in said desired channel and read output from said storage means is displayed by a display section for a time period before an output video signal is obtained from said digital demodulation processing section.

15. An apparatus according to claim 10, further comprising a channel map memory for storing identification information for enabling each of a plurality of channels selectable as a tuning target to be identified as a digital television broadcasting channel or an analog television broadcasting channel, wherein, when said user performs a channel selecting operation, a determination is made by referring to said channel map memory as to whether a channel selected by said channel selecting operation is a digital television broadcasting channel or an analog television broadcasting channel.

16. An apparatus according to claim 15, wherein at least one of said analog television broadcast signal and said digital television broadcast signal contains guide information for presenting to a viewer at least one of a present state of broadcasting of channel programs and a schedule of broadcasting of channel programs, said guide information including a marker bit for enabling each channel to be identified as an analog broadcasting channel or a digital broadcasting channel, said apparatus further comprising:

means for extracting said guide information from said broadcast signal, and for storing, as said identification information in said channel map memory, said marker bit obtained from said extracted guide information.

17. An apparatus according to claim 15 or 16, wherein if said channel selected by said user is an analog television broadcasting channel, a control signal for selecting a carrier in said selected channel is supplied to said second tuner section, and a control signal for selecting a carrier of a digital television broadcast in a channel that is predicted by using said channel map memory to be next selected by said user in a vicinity of said received channel is supplied to said first tuner section.

18. An apparatus according to claim 15 or 16, wherein if said channel selected by said user is an analog television broadcasting channel, a control signal for selecting a carrier in said selected channel is supplied to said second tuner section, and a control signal for selecting a carrier of a digital television broadcast in a channel that is predicted by using said channel map memory to be next selected by said user is supplied to said first tuner section, and wherein if said channel selected by said user is a digital television broadcasting channel, a control signal for selecting a carrier in said selected channel is supplied to said first tuner section, and a control signal for selecting a carrier of an analog television broadcast in a channel that is predicted by using said channel map memory to be next selected by said user in a vicinity of said received channel is supplied to said second tuner section.

19. An apparatus for receiving television broadcasts, comprising:

a first tuner section for receiving one of a plurality of digital television broadcasts, said first tuner section selecting one carrier from an input signal and producing an output signal;

a second tuner section for receiving one of said plurality of digital television broadcasts, said second tuner section selecting one carrier from said input signal and producing an output signal;

a first digital demodulation processing section for separating a desired channel and obtaining an output video signal and an output audio signal by demodulating said output signal from said first tuner section, said first digital demodulation processing section including a channel equalizer formed of a digital filter;

a second digital demodulation processing section for obtaining an output video signal and an output audio signal in a desired channel by demodulating said output signal from said second tuner section, said second digital demodulation processing section including a channel equalizer formed of a digital filter;

a coefficient memory for storing equalizer coefficients for a plurality of channels to be supplied to said digital filter of said channel equalizer;

means for generating equalizer coefficients to be supplied to each channel equalizer based on at least some of said equalizer coefficients in said coefficient memory;

means for making a changeover between selecting said output video signal and said output audio signal from said first digital demodulation processing section for use as reception outputs, and for selecting said output video signal and said output audio signal from said second digital demodulation processing section for use as reception outputs;

means for controlling said means for making a changeover according to a tuning operation performed by a user; and means for supplying a signal for receiving a broadcast signal in a channel that is predicted to be next selected by said user in a vicinity of said received channel to one of said first and second tuner sections that is currently not receiving said broadcast signal from which said output video signal and said output audio signal are used as reception outputs through said means for making a changeover.

20. An apparatus according to claim 19, further comprising means for supplying a predetermined wait-time video signal to a display section for a time period before an output video signal is obtained from said digital demodulation processing section.

21. An apparatus according to claim 19, wherein an image for identification of the selected desired channel is displayed by a display section for a time period before an output video signal is obtained from said digital demodulation processing section.

22. An apparatus according to claim 19, further comprising storage means for storing program information previously provided in said desired channel, wherein said program information previously provided in said desired channel and read output from said storage means is displayed by a display section for a time period before an output video signal is obtained from said digital demodulation processing section.

23. A method of receiving television broadcasts in which, when tuning to a digital broadcast signal is performed in a receiver, a carrier selected in a tuner section of said receiver is demodulated in a front end section and undergoes equalization processing in a channel equalizer of said receiver formed of a digital filter, said method comprising:

providing equalizer coefficients for a plurality of channels in a coefficient memory to be supplied to said digital filter of said channel equalizer; and generating equalizer coefficients supplied to said channel equalizer based on said television broadcast signal and at least some of said equalizer coefficients in said coefficient memory.

24. A method according to claim 23, wherein said equalizer coefficients in said coefficient memory are updated to equalizer coefficients newly generated.

25. A method according to claim 23, wherein a predetermined wait-time video signal is displayed by a display section for a time period before a display output video signal is obtained.

26. A method of receiving television broadcasts in which tuning to and reception of one of a desired analog television broadcasting channel and a desired digital television broadcasting channel are performed by a receiving apparatus having an analog television broadcast receiving tuner section and a television broadcast receiving section, said method comprising:

storing, in a channel map memory, identification information for enabling each selectable channel to be identified as a digital television broadcasting channel or an analog television broadcasting channel; and making, by referring to said channel map memory, a determination as to whether a channel selected by a user is a digital television broadcasting channel or an analog television broadcasting channel, and supplying a tuning control signal to one of said analog television broadcast receiving tuner section and said television broadcast receiving section according to said determination.

27. A method of receiving television broadcasts in which tuning to, and reception of, one of a desired analog television broadcasting channel and a desired digital television broadcasting channel are performed by a receiving apparatus having an analog television broadcast receiving tuner section and a digital television broadcast receiving section, said method comprising:

receiving a broadcast signal in said desired channel by one of said analog television broadcast receiving tuner section and said digital television broadcast receiving section to obtain an image display and an audio output from the received broadcast signal; and receiving a broadcast signal in another channel that is predicted to be next selected by a user in a vicinity of said received channel, said reception being performed in said tuner section that is currently not receiving said broadcast signal from which said image display and said audio output are obtained.

28. A method of receiving television broadcasts using a receiving apparatus which has first and second tuner sections for receiving television broadcasts, at least one of said first and second tuner sections including a channel equalizer formed of a digital filter, and which outputs image data and sound data in a desired digital television broadcasting channel selected and received by one of said first and second tuner sections, said method comprising:

providing equalizer coefficients for a plurality of channels in a coefficient memory to be supplied to said digital filter of said channel equalizer;

receiving a broadcast signal in a desired channel by one of said first and second tuner sections to obtain an image display and an audio output from said received broadcast signal;

generating equalizer coefficients supplied to said channel equalizer based on said television broadcast signal and at least some of said equalizer coefficients in said coefficient memory; and receiving a broadcast signal in another channel that is predicted to be next selected by a user in a vicinity of said received channel, said reception being performed in said tuner section that is currently not receiving said broadcast signal from which said image display and said audio output are obtained.

29. An apparatus according to claim 6, wherein said digital demodulation processing section has a channel equalizer formed of a digital filter, said apparatus further comprising:

a coefficient memory for storing equalizer coefficients to be supplied to said digital filter of said channel equalizer; and control means for generating equalizer coefficients to be supplied to said channel equalizer based on said equalizer coefficients in the coefficient memory.

* * * * *

UNITED STATES PATENT AND TRADEMARK OFFICE
CERTIFICATE OF CORRECTION

PATENT NO.   : 6,490,001 B1
DATED        : December 3, 2002
INVENTOR(S)  : Peter Shintani and Hirofumi Usui It is certified that error appears in the above-identified patent and that said Letters Patent is hereby corrected as shown below:

<u>Title page,</u>
Item [30], Foreign Applications Priority Data, "10-003874" should read -- P10-003874 --. "10-151223" should read -- P10-151223 --.

<u>Column 6,</u>
Line 32, "section", should read -- sections --.

<u>Column 10,</u>
Line 10, "t", should read -- to --.

<u>Column 15,</u>
Line 4, after "section 31", insert -- stores --.
Line 11, "performed. The", should read -- performed, the --.

<u>Column 16,</u>
Line 4, after "as", delete ",".
Line 66, "is", should read -- are --.

<u>Column 18,</u>
Line 8, "is", should read -- are --.
Line 57, after "can", insert -- be --.

<u>Column 20,</u>
Line 58, "sill", should read -- still --.

<u>Column 21,</u>
Line 11, "are", should read -- is --.
Line 15, "Four", should read -- For --.
Line 27, "a-selected", should read -- a selected --.

UNITED STATES PATENT AND TRADEMARK OFFICE
CERTIFICATE OF CORRECTION

PATENT NO. : 6,490,001 B1
DATED : December 3, 2002
INVENTOR(S) : Peter Shintani and Hirofumi Usui It is certified that error appears in the above-identified patent and that said Letters Patent is hereby corrected as shown below:

Column 22,
Line 19, "filer", should read -- filter --.
Line 52, "is" should read -- are --.

Signed and Sealed this

Thirteenth Day of May, 2003

JAMES E. ROGAN
*Director of the United States Patent and Trademark Office*